United States Patent
Wei et al.

(10) Patent No.: US 11,570,822 B2
(45) Date of Patent: Jan. 31, 2023

(54) UE-ASSISTED GROUP RESPONSE FOR TWO-STEP RANDOM ACCESS PROCEDURE

(71) Applicant: QUALCOMM Incorporated, San Diego, CA (US)

(72) Inventors: Chao Wei, Beijing (CN); Jing Lei, San Diego, CA (US); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/824,796

(22) Filed: May 25, 2022

(65) Prior Publication Data
US 2022/0295567 A1 Sep. 15, 2022

Related U.S. Application Data

(63) Continuation of application No. PCT/CN2020/131754, filed on Nov. 26, 2020.

(30) Foreign Application Priority Data

Dec. 24, 2019 (WO) ................ PCT/CN2019/127822

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0004* (2013.01); *H04L 1/08* (2013.01); *H04W 74/006* (2013.01)

(58) Field of Classification Search
CPC ............ H04W 74/0833; H04W 74/006; H04L 1/0004; H04L 1/08
See application file for complete search history.

(56) References Cited

U.S. PATENT DOCUMENTS

2014/0204857 A1 7/2014 Mallik et al.
2018/0077645 A1* 3/2018 Yan .................. H04W 52/0216
(Continued)

FOREIGN PATENT DOCUMENTS

EP          2903195 A1    8/2015
WO    WO2016115667 A1    7/2016
(Continued)

OTHER PUBLICATIONS

International Search Report and Written Opinion—PCT/CN2019/127822—ISA/EPO—Sep. 17, 2020.
(Continued)

*Primary Examiner* — Brian D Nguyen
(74) *Attorney, Agent, or Firm* — Holland & Hart LLP/Qualcomm

(57) ABSTRACT

Methods, systems, and devices for wireless communications are described. In a random access (RACH) procedure, a user equipment (UE) may transmit a first RACH message (e.g., RACH Message A (MsgA)) to a base station, which may include an indication of a modulation order, a maximum number of repetitions for RACH Message B (MsgB) data, or both. The base station may multiplex random access responses (RARs) for UEs into second RACH messages (e.g., RACH MsgBs) based on the indication(s) and may transmit these RACH MsgBs. The UE may receive and decode a downlink control information (DCI) portion of a RACH MsgB but may determine not to decode the data portion of the RACH MsgB if an indication in the DCI of the modulation order, the threshold number of repetitions, or both does not match the value reported by the UE. Otherwise, the UE may decode the full RACH MsgB.

30 Claims, 18 Drawing Sheets

(51) Int. Cl.
*H04L 1/08* (2006.01)
*H04W 74/00* (2009.01)

(56) References Cited

U.S. PATENT DOCUMENTS

| | | | |
|---|---|---|---|
| 2018/0241499 | A1 | 8/2018 | Einhaus et al. |
| 2021/0250972 | A1* | 8/2021 | Munier ................... H04L 1/189 |
| 2022/0022259 | A1* | 1/2022 | Atungsiri .......... H04W 74/0833 |
| 2022/0039074 | A1* | 2/2022 | Oh ....................... H04W 72/042 |
| 2022/0053469 | A1* | 2/2022 | Horiuchi ................ H04L 1/1812 |
| 2022/0131652 | A1* | 4/2022 | Bae ........................ H04L 5/1469 |
| 2022/0232643 | A1* | 7/2022 | Matsumura ....... H04W 74/0841 |

FOREIGN PATENT DOCUMENTS

| | | |
|---|---|---|
| WO | WO2019086039 A1 | 5/2019 |
| WO | WO2019194928 A1 | 10/2019 |

OTHER PUBLICATIONS

International Search Report and Written Opinion—PCT/CN2020/131754—ISA/EPO—Feb. 22, 2021.

* cited by examiner

US 11,570,822 B2

UE-ASSISTED GROUP RESPONSE FOR TWO-STEP RANDOM ACCESS PROCEDURE

CROSS-REFERENCE

The present application for patent is a Bypass Continuation of PCT Application No. PCT/CN2020/131754 by WEI et al., entitled "UE-ASSISTED GROUP RESPONSE FOR TWO-STEP RANDOM ACCESS PROCEDURE," filed Nov. 26, 2020, which claims the benefit of PCT Application No. PCT/CN2019/127822 by WEI et al., entitled "UE-ASSISTED GROUP RESPONSE FOR TWO-STEP RANDOM ACCESS PROCEDURE," filed Dec. 24, 2019, both of which are assigned to the assignee hereof and both of which are expressly incorporated by reference herein.

FIELD OF TECHNOLOGY

The following relates generally to wireless communications and more specifically to user equipment (UE)-assisted group response for a random access (e.g., two-step random access) procedure.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station and a UE operating in a wireless communications system may perform a random access (RACH) procedure in order to complete a handover, adjust a network connection, switch from an idle mode to a connected mode, or perform some combination of these or other connection establishment processes. If performing a two-step RACH procedure, a UE may send a first RACH message—such as a RACH Message A (MsgA)—to a base station, and the base station may respond to one or more UEs with a second RACH message, such as a RACH Message B (MsgB). In some cases, the base station may receive multiple RACH MsgAs from multiple UEs in the system. However, the base station may fail to efficiently reserve resources for RACH MsgB transmissions in response, and each UE monitoring for a response may experience significant latency, complexity of processing, or both due the number of RACH procedures handled concurrently by the base station. Efficient RACH MsgB group transmission techniques may be desirable.

SUMMARY

The described techniques relate to improved methods, systems, devices, and apparatuses that support user equipment (UE)-assisted random access (RACH) Message B (MsgB) group transmission. Generally, the described techniques provide for power savings at a UE performing a RACH procedure. A UE may report information to a base station in a first step of a two-step RACH procedure, and the base station may select whether to use the information provided in the report in the second step of the two-step RACH procedure. For example, the UE may report information (e.g., a modulation order, a maximum number of repetitions for receiving the data portion of a MsgB in response, or both) to a base station in a RACH Message A (MsgA). The base station may send, in response to the MsgA, a RACH MsgB based on the reported information indicated in the MsgA. In some cases, the base station may multiplex random access responses (RARs) for UEs according to the reported information. For example, the base station may group RARs for UEs indicating a same value, such as a first modulation order, into a same MsgB and may transmit this MsgB using this same value (e.g., the first modulation order). The base station may group RARs for other UEs indicating other values into different MsgBs. A UE reporting a first modulation order may decode the MsgB transmitted using the first modulation order and may improve power savings by terminating decoding early for other MsgBs transmitted using different modulation orders (e.g., by not decoding data portions for these MsgBs). In some other cases, the base station may override the information reported by the UEs and may include an indication of such an override in the MsgB (e.g., such that a UE decodes a MsgB regardless of the modulation order for the MsgB, the maximum number of repetitions for the MsgB data, or both).

A method for wireless communications at a UE is described. The method may include transmitting, to a base station in a first message for a RACH procedure, an indication of a first modulation order for receiving a second message for the RACH procedure from the base station, receiving, from the base station, a downlink control information (DCI) portion of the second message, and decoding the second message based on the DCI portion indicating the first modulation order, or indicating suppression of validation of a modulation order for a data portion of the second message, or both, including decoding the DCI portion of the second message and decoding the data portion of the second message.

An apparatus for wireless communications at a UE is described. The apparatus may include a processor, memory coupled with the processor, and instructions stored in the memory. The instructions may be executable by the processor to cause the apparatus to transmit, to a base station in a first message for a RACH procedure, an indication of a first modulation order for receiving a second message for the RACH procedure from the base station, receive, from the base station, a DCI portion of the second message, and decode the second message based on the DCI portion indicating the first modulation order, or indicating suppression of validation of a modulation order for a data portion of the second message, or both, including decoding the DCI portion of the second message and decoding the data portion of the second message.

Another apparatus for wireless communications at a UE is described. The apparatus may include means for transmitting, to a base station in a first message for a RACH procedure, an indication of a first modulation order for receiving a second message for the RACH procedure from the base station, receiving, from the base station, a DCI portion of the second message, and decoding the second message based on the DCI portion indicating the first modulation order, or indicating suppression of validation of a modulation order for a data portion of the second message, or both, including decoding the DCI portion of the second message and decoding the data portion of the second message.

A non-transitory computer-readable medium storing code for wireless communications at a UE is described. The code may include instructions executable by a processor to transmit, to a base station in a first message for a RACH procedure, an indication of a first modulation order for receiving a second message for the RACH procedure from the base station, receive, from the base station, a DCI portion of the second message, and decode the second message based on the DCI portion indicating the first modulation order, or indicating suppression of validation of a modulation order for a data portion of the second message, or both, including decoding the DCI portion of the second message and decoding the data portion of the second message.

Some examples of the method, apparatuses, and non-transitory computer-readable medium described herein may further include operations, features, means, or instructions for receiving, from the base station, an additional DCI portion of an additional second message for the RACH procedure and decoding the additional second message based on the additional DCI portion indicating a second modulation order different from the first modulation order, including decoding the additional DCI portion of the additional second message and not decoding an additional data portion of the additional second message.

In some examples of the method, apparatuses, and non-transitory computer-readable medium described herein, the additional data portion is not decoded further based on the decoded additional DCI portion indicating no suppression of the validation of the modulation order for the additional data portion.

In some examples of the method, apparatuses, and non-transitory computer-readable medium described herein, the decoded DCI portion includes a bit field indicating a modulation and coding scheme (MCS), and the data portion may be decoded based on the MCS corresponding to the first modulation order.

In some examples of the method, apparatuses, and non-transitory computer-readable medium described herein, the decoded DCI portion includes a one bit indicator indicating that the validation of the modulation order for the data portion is suppressed, and the data portion may be decoded based on the one bit indicator.

In some examples of the method, apparatuses, and non-transitory computer-readable medium described herein, the indication of the first modulation order in the first message includes a bit field in a physical (PHY) layer signaling message, a medium access control (MAC) control element (CE), or both.

In some examples of the method, apparatuses, and non-transitory computer-readable medium described herein, the first modulation order includes quadrature phase shift keying (QPSK), 16 quadrature amplitude modulation (16QAM), 64 quadrature amplitude modulation (64QAM), or 256 quadrature amplitude modulation (256QAM).

A method for wireless communications at a base station is described. The method may include receiving, from a set of UEs in a set of first messages for RACH procedures, a set of indications of respective modulation orders associated with reception of one or more second messages for the RACH procedures at the set of UEs, multiplexing a set of random access responses (RARs) for the set of UEs into one or more data portions for the one or more second messages based on the respective modulation orders, and transmitting, to the set of UEs, the one or more second messages, where each second message of the one or more second messages includes a respective DCI portion indicating a modulation order and a respective data portion of the one or more data portions.

An apparatus for wireless communications at a base station is described. The apparatus may include a processor, memory coupled with the processor, and instructions stored in the memory. The instructions may be executable by the processor to cause the apparatus to receive, from a set of UEs in a set of first messages for RACH procedures, a set of indications of respective modulation orders associated with reception of one or more second messages for the RACH procedures at the set of UEs, multiplex a set of RARs for the set of UEs into one or more data portions for the one or more second messages based on the respective modulation orders, and transmit, to the set of UEs, the one or more second messages, where each second message of the one or more second messages includes a respective DCI portion indicating a modulation order and a respective data portion of the one or more data portions.

Another apparatus for wireless communications at a base station is described. The apparatus may include means for receiving, from a set of UEs in a set of first messages for RACH procedures, a set of indications of respective modulation orders associated with reception of one or more second messages for the RACH procedures at the set of UEs, multiplexing a set of RARs for the set of UEs into one or more data portions for the one or more second messages based on the respective modulation orders, and transmitting, to the set of UEs, the one or more second messages, where each second message of the one or more second messages includes a respective DCI portion indicating a modulation order and a respective data portion of the one or more data portions.

A non-transitory computer-readable medium storing code for wireless communications at a base station is described. The code may include instructions executable by a processor to receive, from a set of UEs in a set of first messages for RACH procedures, a set of indications of respective modulation orders associated with reception of one or more second messages for the RACH procedures at the set of UEs, multiplex a set of RARs for the set of UEs into one or more data portions for the one or more second messages based on the respective modulation orders, and transmit, to the set of UEs, the one or more second messages, where each second message of the one or more second messages includes a respective DCI portion indicating a modulation order and a respective data portion of the one or more data portions.

In some examples of the method, apparatuses, and non-transitory computer-readable medium described herein, the multiplexing may include operations, features, means, or instructions for multiplexing a first subset of RARs of the set of RARs into a first data portion for a first of the one or more second messages based on the first subset of RARs being in response to a first subset of the set of first messages including indications of a first modulation order of the respective modulation orders and multiplexing a second subset of RARs of the set of RARs into a second data portion for a second of the one or more second messages based on the second subset of RARs being in response to a second subset of the set of first messages including indications of a second modulation order of the respective modulation orders different from the first modulation order.

In some examples of the method, apparatuses, and non-transitory computer-readable medium described herein, the multiplexing may include operations, features, means, or instructions for multiplexing the set of RARs into a data portion for a second message based on suppressing validation of a modulation order at the set of UEs for the data portion, and the transmitting may include operations, features, means, or instructions for transmitting, to the set of UEs, the second message including a DCI portion and the data portion, where the DCI portion indicates the suppression of the validation of the modulation order at the set of UEs for the data portion.

In some examples of the method, apparatuses, and non-transitory computer-readable medium described herein, the respective modulation orders include QPSK, 16QAM, 64QAM, 256QAM, or a combination thereof.

A method for wireless communications at a UE is described. The method may include transmitting, to a base station in a first message for a RACH procedure, an indication of a first maximum number of repetitions for receiving a second message for the RACH procedure, receiving, from the base station, a DCI portion of the second message, and decoding the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

An apparatus for wireless communications at a UE is described. The apparatus may include a processor, memory coupled with the processor, and instructions stored in the memory. The instructions may be executable by the processor to cause the apparatus to transmit, to a base station in a first message for a RACH procedure, an indication of a first maximum number of repetitions for receiving a second message for the RACH procedure, receive, from the base station, a DCI portion of the second message, and decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

Another apparatus for wireless communications at a UE is described. The apparatus may include means for transmitting, to a base station in a first message for a RACH procedure, an indication of a first maximum number of repetitions for receiving a second message for the RACH procedure, receiving, from the base station, a DCI portion of the second message, and decoding the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

A non-transitory computer-readable medium storing code for wireless communications at a UE is described. The code may include instructions executable by a processor to transmit, to a base station in a first message for a RACH procedure, an indication of a first maximum number of repetitions for receiving a second message for the RACH procedure, receive, from the base station, a DCI portion of the second message, and decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

Some examples of the method, apparatuses, and non-transitory computer-readable medium described herein may further include operations, features, means, or instructions for receiving, from the base station, an additional DCI portion of an additional second message for the RACH procedure and decoding the additional second message based on the additional DCI portion indicating a second maximum number of repetitions different from the first maximum number of repetitions, including decoding the additional DCI portion of the additional second message and not decoding an additional repeated data portion of the additional second message.

In some examples of the method, apparatuses, and non-transitory computer-readable medium described herein, the additional repeated data portion is not decoded further based on the decoded additional DCI portion indicating no suppression of the validation of the maximum number of repetitions for the additional repeated data portion.

Some examples of the method, apparatuses, and non-transitory computer-readable medium described herein may further include operations, features, means, or instructions for receiving, from the base station, an additional DCI portion of an additional second message for the RACH procedure and decoding the additional second message based on the additional DCI portion indicating no repetitions for the additional data portion, including decoding the additional DCI portion of the additional second message and not decoding an additional data portion of the additional second message.

Some examples of the method, apparatuses, and non-transitory computer-readable medium described herein may further include operations, features, means, or instructions for receiving, from the base station, an indication of a default maximum number of repetitions for receiving the second message, where the indication of the first maximum number of repetitions may be transmitted in the first message based on the first maximum number of repetitions being different from the default maximum number of repetitions.

In some examples of the method, apparatuses, and non-transitory computer-readable medium described herein, the decoded DCI portion includes a one bit indicator indicating that the maximum number of repetitions for the repeated data portion corresponds to the first maximum number of repetitions indicated in the first message and the repeated data portion may be decoded based on the one bit indicator.

In some examples of the method, apparatuses, and non-transitory computer-readable medium described herein, the decoded DCI portion includes a bit field indicating the maximum number of repetitions for the repeated data portion, and the repeated data portion may be decoded based on the maximum number of repetitions for the repeated data portion indicated by the bit field being equal to the first maximum number of repetitions indicated in the first message.

In some examples of the method, apparatuses, and non-transitory computer-readable medium described herein, the decoded DCI portion includes a bit field indicating that the validation of the maximum number of repetitions for the repeated data portion may be suppressed, and the repeated data portion may be decoded based on the bit field.

In some examples of the method, apparatuses, and non-transitory computer-readable medium described herein, the indication of the first maximum number of repetitions in the first message includes a bit field in a PHY layer signaling message, a MAC CE, or both.

A method for wireless communications at a base station is described. The method may include receiving, from a set of UEs in a set of first messages for RACH procedures, a set of indications of respective maximum numbers of repetitions associated with reception of one or more second messages for the RACH procedures at the set of UEs, multiplexing a set of RARs for the set of UEs into one or more repeated data portions for the one or more second messages based on the respective maximum numbers of repetitions, and transmitting, to the set of UEs, the one or more second messages, where each second message of the one or more second messages includes a respective DCI portion indicating a maximum number of repetitions and a respective repeated data portion of the one or more repeated data portions.

An apparatus for wireless communications at a base station is described. The apparatus may include a processor, memory coupled with the processor, and instructions stored in the memory. The instructions may be executable by the processor to cause the apparatus to receive, from a set of UEs in a set of first messages for RACH procedures, a set of indications of respective maximum numbers of repetitions associated with reception of one or more second messages for the RACH procedures at the set of UEs, multiplex a set of RARs for the set of UEs into one or more repeated data portions for the one or more second messages based on the respective maximum numbers of repetitions, and transmit, to the set of UEs, the one or more second messages, where each second message of the one or more second messages includes a respective DCI portion indicating a maximum number of repetitions and a respective repeated data portion of the one or more repeated data portions.

Another apparatus for wireless communications at a base station is described. The apparatus may include means for receiving, from a set of UEs in a set of first messages for RACH procedures, a set of indications of respective maximum numbers of repetitions associated with reception of one or more second messages for the RACH procedures at the set of UEs, multiplexing a set of RARs for the set of UEs into one or more repeated data portions for the one or more second messages based on the respective maximum numbers of repetitions, and transmitting, to the set of UEs, the one or more second messages, where each second message of the one or more second messages includes a respective DCI portion indicating a maximum number of repetitions and a respective repeated data portion of the one or more repeated data portions.

A non-transitory computer-readable medium storing code for wireless communications at a base station is described. The code may include instructions executable by a processor to receive, from a set of UEs in a set of first messages for RACH procedures, a set of indications of respective maximum numbers of repetitions associated with reception of one or more second messages for the RACH procedures at the set of UEs, multiplex a set of RARs for the set of UEs into one or more repeated data portions for the one or more second messages based on the respective maximum numbers of repetitions, and transmit, to the set of UEs, the one or more second messages, where each second message of the one or more second messages includes a respective DCI portion indicating a maximum number of repetitions and a respective repeated data portion of the one or more repeated data portions.

In some examples of the method, apparatuses, and non-transitory computer-readable medium described herein, the multiplexing may include operations, features, means, or instructions for multiplexing a first subset of RARs of the set of RARs into a first repeated data portion for a first of the one or more second messages based on the first subset of RARs being in response to a first subset of the set of first messages including indications of a first maximum number of repetitions of the respective maximum numbers of repetitions and multiplexing a second subset of RARs of the set of RARs into a second repeated data portion for a second of the one or more second messages based on the second subset of RARs being in response to a second subset of the set of first messages including indications of a second maximum number of repetitions of the respective maximum numbers of repetitions different from the first maximum number of repetitions.

In some examples of the method, apparatuses, and non-transitory computer-readable medium described herein, the multiplexing may include operations, features, means, or instructions for multiplexing the set of RARs into a repeated data portion for a second message based on suppressing validation of a maximum number of repetitions at the set of UEs for the repeated data portion, and the transmitting may include operations, features, means, or instructions for transmitting, to the set of UEs, the second message including a DCI portion and the repeated data portion, where the DCI portion indicates the suppression of the validation of the maximum number of repetitions at the set of UEs for the repeated data portion.

In some examples of the method, apparatuses, and non-transitory computer-readable medium described herein, the multiplexing may include operations, features, means, or instructions for multiplexing a subset of RARs of the set of RARs into a data portion for a first of the one or more second messages based on the data portion for the first of the one or more second messages including no repetitions.

Some examples of the method, apparatuses, and non-transitory computer-readable medium described herein may further include operations, features, means, or instructions for transmitting, to the set of UEs, an indication of a default maximum number of repetitions associated with reception of the one or more second messages, where the set of indications of the respective maximum numbers of repetitions may be received in the set of first messages based on the respective maximum numbers of repetitions being different from the default maximum number of repetitions.

DETAILED DESCRIPTION

Figure 1:
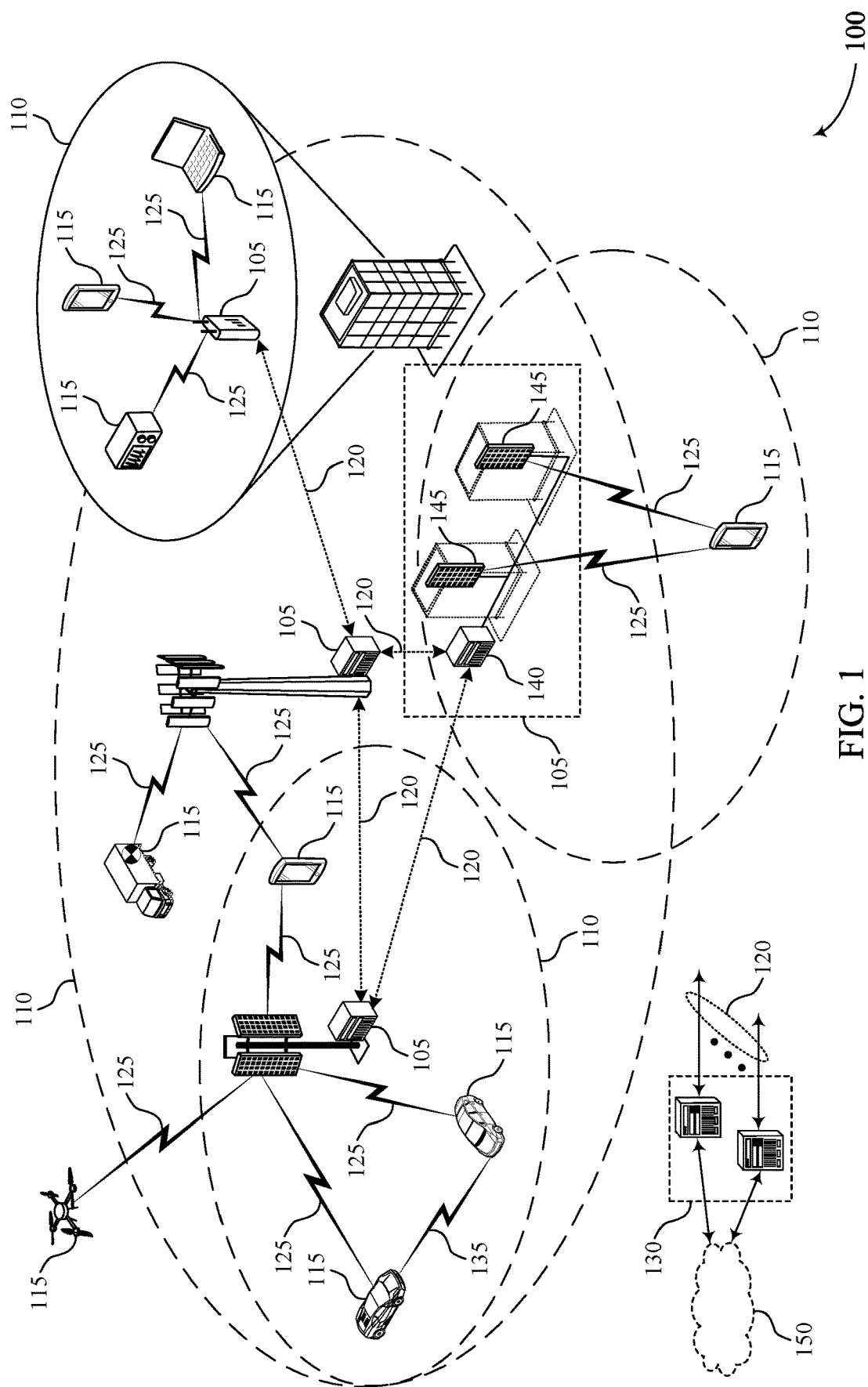
FIGS. 1 through 3 illustrate examples of wireless communications systems that support user equipment (UE)-assisted group response for a two-step random access procedure in accordance with aspects of the present disclosure.

Wireless devices operating within a wireless communications system, such as a New Radio (NR) network, may use a two-step random access (RACH) procedure to perform a handover, adjust a network connection, switch from an idle mode to a connected mode, or perform some other connection establishment procedure. For example, a user equipment (UE) may send, to a base station, a first RACH message (e.g., a RACH Message A (MsgA)) to initiate a RACH procedure. Upon receiving the first RACH message from the UE, the base station may schedule a second RACH message (e.g., a RACH Message B (MsgB)) including a random access response (RAR) to the first RACH message. In some cases, the base station may multiplex RARs for multiple UEs within a same MsgB to reduce signaling overhead. However, to transmit a MsgB with RARs for a group of UEs, the base station may select transmission parameters—such as a modulation and coding scheme (MCS)—for the MsgB based on the UE of the group of UEs with the lowest channel quality conditions. This may cause inefficient resource reservation for MsgB transmissions and may result in significant latency and complexity of processing at one or more of the UEs.

To reduce UE processing overhead during two-step RACH procedures, a base station may implement UE-assisted RACH MsgB group transmissions. A UE may report, in a RACH MsgA transmission, downlink channel quality information (e.g., a modulation order, a maximum number of repetitions for coverage enhancement, or both) to the base station. The base station may use this information to transmit one or more RACH MsgBs in response. For example, the base station may multiplex RAR messages to UEs with similar downlink channel quality information. A UE may decode a first portion of the MsgB (e.g., the downlink control information (DCI) portion) and may determine whether to decode a second portion of the MsgB (e.g., the data payload portion) based on the decoded DCI. If the DCI indicates that the MsgB corresponds to the information reported by the UE in the MsgA, the UE may decode the full MsgB to determine if the MsgB includes a RAR for the UE. Otherwise, for improved power savings at the UE, the UE may terminate decoding without decoding the data portion of the MsgB.

For example, a UE may report a modulation order in a MsgA physical uplink shared channel (PUSCH), and the base station may aggregate RARs for UEs with similar reported modulation orders into a shared MsgB. When the UE receives the MsgB and decodes the downlink control information (DCI) portion of the MsgB, the UE may determine whether the MCS indicated by the DCI for the data portion of the MsgB (i.e., the physical downlink shared channel (PDSCH) portion of the MsgB) matches the modulation order reported in the MsgA. If the MCS matches, the UE may determine that this MsgB may contain a RAR for the UE and may continue to decode the MsgB PDSCH. Otherwise, the UE may not decode the MsgB PDSCH. A similar process may occur if the UE reports a threshold (e.g., maximum) number of repetitions for MsgB PDSCH instead of, or in addition to, the modulation order.

In some cases, a base station may determine to override UE reporting to improve efficiencies in the RACH procedure. For example, the base station may override the UE reporting when few UEs select the same modulation order. The base station may receive a MsgA transmission from multiple UEs, in which each MsgA transmission may include a channel quality indication (e.g., a modulation order, a maximum number of repetitions, or both). If, in a specific example, each UE reports a different channel quality indication and the base station multiplexes RARs for the UEs based on the channel quality indications, the base station may determine to send a separate MsgB transmission for each UE, resulting in inefficient resource allocation and relatively high signaling overhead. Thus, it may be beneficial for the base station to override the UE reporting in some situations. In such cases, the base station may multiplex RARs for UEs with different channel quality indications and may include a one bit indicator in the DCI to inform the UEs that the base station overrode the reported channel quality indications in the MsgAs. Based on this indicator in the DCI, a UE may determine to decode a full MsgB, even if the DCI portion does not indicate the reported channel quality information (e.g., the reported modulation order, maximum number of repetitions, or both) for that UE.

Aspects of the disclosure are initially described in the context of wireless communications systems. Additional aspects of the disclosure are described with reference to channel structures and process flows. Aspects of the disclosure are further illustrated by and described with reference to apparatus diagrams, system diagrams, and flowcharts that relate to UE-assisted RACH MsgB group transmission.

FIG. 1 illustrates an example of a wireless communications system 100 that supports UE-assisted group response for a two-step random access procedure in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless devices operating in a wireless communications system 100 (e.g., an NR network or some other network) may participate in a two-step RACH procedure to reduce delay and signaling overhead as compared to a four-step RACH procedure. A first RACH message (e.g., MsgA) in two-step RACH, sent from a UE 115 to a base station 105, may combine the contents of a RACH Message 1 (Msg1) and a RACH Message 3 (Msg3) as used in four-step RACH. For example, a RACH MsgA may include a RACH preamble and a physical uplink shared channel (PUSCH) payload with the contents of the message (e.g., equivalent to Msg3), where the preamble and the payload may be transmitted on separate waveforms. In response, the base station 105 may transmit a corresponding second RACH message (e.g., MsgB) to the UE 115, where the MsgB may combine the equivalent contents of a RACH Message 2 (Msg2) and a RACH Message 4 (Msg4) as used in four-step RACH. For example, a RACH MsgB may include a physical downlink control channel (PDCCH) portion and a physical downlink shared channel (PDSCH) portion. The UE 115 may monitor for the RACH MsgB in a RAR window. The RACH MsgB may include a RAR for the UE 115, the detected preamble, a UE 115 identifier, a timing advance, a back-off indicator, a contention resolution message, power control parameters, or any combination thereof.

In some cases, a base station 105 may aggregate multiple RARs belonging to different UEs 115 in one MsgB PDSCH. Each RAR may be a SuccessRAR or a FallbackRAR. For example, a SucessRAR may indicate successful reception of the MsgA at the base station 105 and may facilitate contention resolution and completion of the RACH procedure. A FallbackRAR may indicate unsuccessful reception of the MsgA (e.g., unsuccessful reception of the MsgA payload) at the base station 105 and may include a request for retransmission of the MsgA payload on granted resources if the MsgA preamble detection is successful but the MsgA payload reception or decoding fails.

In some cases, when the base station 105 multiplexes RARs for a group of UEs on one MsgB PDSCH, the base station 105 may determine which MCS to use for MsgB PDSCH transmission based on the UE 115 of the group with the "worst" channel conditions (e.g., the lowest channel quality indicator (CQI) corresponding to the lowest MCS index). This may result in inefficient resource reservation and may potentially increase latency and complexity at a UE 115 processing the MsgB transmission. Additionally, or alternatively, the base station 105 may send multiple MsgB transmissions with the same random access radio network temporary identifier (RA-RNTI) within a RAR window to different UEs 115 or groups of UEs 115. A UE 115 may receive multiple MsgB PDSCHs and may process the MsgBs concurrently, resulting in significant processing overhead at the UE 115. In some cases, the UE grouping in different MsgBs may be inaccurate due to asymmetric interference of uplink and downlink channels, and each UE 115 may decode MsgB PDSCHs that are not intended for that UE 115.

To support efficient resource allocation during a MsgB transmission, a base station 105 may utilize information provided by a UE 115 in a MsgA transmission in order to schedule a MsgB transmission. The UE 115 may include a report of channel quality information (e.g., a modulation order, a maximum number of repetitions for MsgB PDSCH for coverage enhancement, or both) in the MsgA transmission. In some examples, the base station 105 may determine whether to use this report to schedule MsgB PDSCH transmissions. As such, the base station 105 may include one or more bits in the DCI to indicate whether the base station is overriding the reported channel quality information or not for the MsgB PDSCH. If the base station overrides the reported channel quality information, a UE 115 receiving the MsgB may skip validating whether the modulation order, maximum number of repetitions, or both indicated in the MsgB DCI match the value(s) reported by the UE 115, and the UE 115 may instead automatically decode the data portion of the MsgB regardless of these values.

Figure 2:
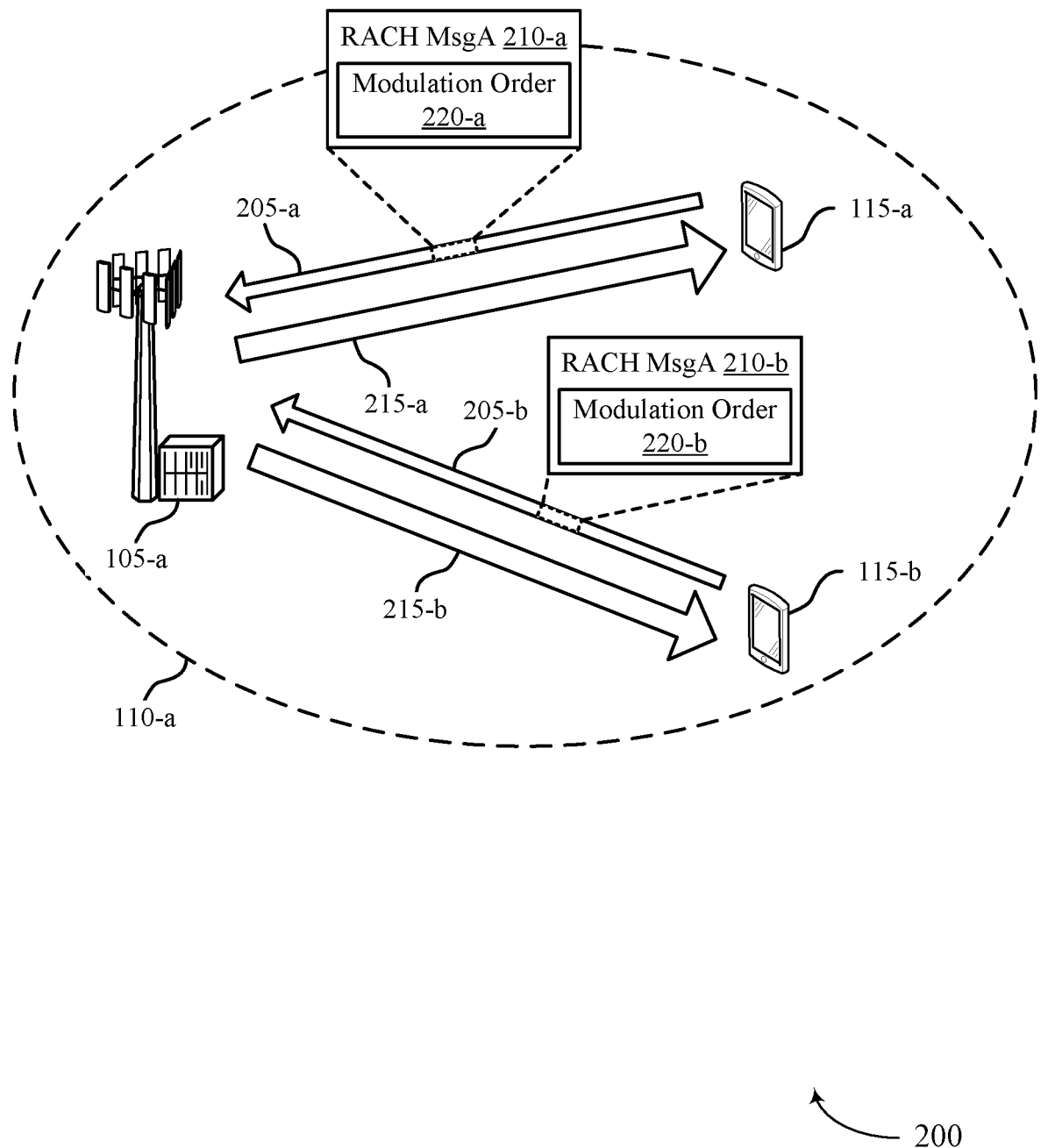

FIG. 2 illustrates an example of a wireless communications system 200 that supports UE-assisted group response for a two-step random access procedure in accordance with aspects of the present disclosure. In some examples, wireless communications system 200 may implement aspects of wireless communications system 100 and may include UE 115-a, UE 115-b, and base station 105-a supporting coverage area 110-a, which may be examples of UEs 115, a base station 105, and a coverage area 110 described with reference to FIG. 1. As described herein, UE 115-a and UE 115-b may initiate two-step RACH procedures by signaling RACH MsgA 210-a on uplink channel 205-a and signaling RACH MsgA 210-b on uplink channel 205-b, respectively, to base station 105-a. An uplink channel 205 may include a physical uplink control channel (PUCCH), a physical random access channel (PRACH), or a PUSCH, or the uplink channel 205 may illustrate some combination of these channels. UE 115-a and UE 115-b may include indications of modulation order 220-a and modulation order 220-b, respectively, in the RACH MsgAs 210 to support UE-assisted RACH MsgB group transmissions at base station 105-a.

The UEs 115 may perform contention-based or a contention-free RACH procedures. A two-step RACH procedure may reduce latency and signaling overhead as compared to a four-step RACH procedure (e.g., by supporting contention-based, small uplink packet transmissions). In some examples, a RACH MsgA 210 may include a RACH preamble and a payload message (e.g., a PUSCH payload). Base station 105-a may respond to RACH MsgA 210-a and RACH MsgA 210-b by transmitting one or more RACH MsgBs on downlink channel 215-a and downlink channel 215-b to UE 115-a and UE 115-b. A downlink channel 215 may include a PDCCH or a PDSCH, or the downlink channel 215 may illustrate a combination of these channels. A RACH MsgB may include a detected preamble, UE identifier, timing advance, back-off indicator, contention resolution message, power control parameters, or some combination of these or other relevant parameters.

UE 115-a, UE 115-b, or both may initiate a two-step RACH procedure to complete a handover, correct out-of-sync communications, request scheduled resources, or perform another connection establishment procedure by transmitting a RACH MsgA 210 to base station 105-a. Base station 105-a may respond to received RACH MsgAs 210 by multiplexing RARs for UEs 115 that transmit the RACH preamble with similar credentials (e.g., on the same RACH occasion, in the same MAC protocol data unit (PDU), or both). For two-step RACH, base station 105-a may send the RAR within a time period (e.g., 40 ms) after the UE 115 sends the RACH preamble in a MsgA 210, which may be referred to as a RAR window. During the RAR window for a MsgA transmission, the UE 115 that transmitted the MsgA may monitor for a MsgB carrying the corresponding RAR. The base station 105-a may schedule the RARs using a PDCCH message (e.g., a DCI message) scrambled using an RA-RNTI associated with the MsgA (e.g., RACH MsgA 210-a or MsgA 210-b) according to the RACH occasion and RACH preamble for the MsgA. If base station 105-a multiplexes RARs of different UEs 115 (e.g., UE 115-a and UE 115-b) on one MsgB, the MCS for the data portion of this MsgB may be based on the UE 115 with the "worst" channel condition (e.g., corresponding to the lowest MCS index). This may result in inefficient resource reservations for the MsgB and may potentially increase latency and complexity in processing the MsgB at UE 115-a, UE 115-b, or both.

Additionally, or alternatively, base station 105-a may send multiple MsgBs with the same RA-RNTI within the RAR window to different UEs or UE groups (e.g., UE 115-a and UE 115-b). As a result, UE 115-a and UE 115-b may receive multiple MsgB PDSCHs in the RAR window and—in some cases—may process the multiple MsgB PDSCHs concurrently. In some examples, the grouping of UE 115-a and UE 115-b may be based on inaccurate measurements by base station 105-a (e.g., due to asymmetric interference on uplink channels 205 and downlink channels 215). Additionally, UE 115-a and UE 115-b may decode both MsgBs to determine which MsgB includes the UE's RAR if base station 105-a sends multiple MsgBs with the same RA-RNTI. To mitigate such inefficiencies and latencies in the two-step RACH procedure, UE 115-a and UE 115-b may report downlink channel quality (e.g., a modulation order 220 or another indication of downlink channel quality) in the RACH MsgAs 210 to support UE-assisted RACH MsgB group transmissions.

Each UE 115 may measure a downlink channel quality and determine a modulation order for downlink transmissions (e.g., for a MsgB data portion) based on the downlink channel quality. UE 115-a may indicate a modulation order 220-a in RACH MsgA 210-a and UE 115-b may indicate a modulation order 220-b in RACH MsgA 210-b. In some cases, the UEs 115 may report the modulation order 220 using a bit field in the RACH MsgA payload (e.g., a two bit field). The modulation order 220 may be quadrature phase shift keying (QPSK) (e.g., indicated by a bit field value {00}), 16 quadrature amplitude modulation (16QAM) (e.g., indicated by a bit field value {01}), 64 quadrature amplitude modulation (64QAM) (e.g., indicated by a bit field value {10}), 256 quadrature amplitude modulation (256QAM)

(e.g., indicated by a bit field value {11}), or any other modulation order. A UE 115 may transmit the indication of the modulation order 220 using Layer 1 (L1) signaling or in a MAC control element (CE). When base station 105-*a* receives the RACH MsgAs 210-*a* and 210-*b*, base station 105-*a* may multiplex RARs for UEs 115 based on similar downlink channel quality information, such as the indicated modulation orders 220.

For example, UE 115-*a* may report modulation order 220-*a* in RACH MsgA 210-*a*. Based on modulation order 220-*a*, base station 105-*a* may aggregate RARs for UEs 115 with the same modulation order 220 as modulation order 220-*a* into a RACH MsgB PDSCH portion. Base station 105-*a* may transmit the RACH MsgB, including a PDCCH portion and a PDSCH portion, to the UEs 115. When UE 115-*a* receives the RACH MsgB PDCCH portion (e.g., a DCI portion), UE 115-*a* may detect that the DCI—or a cyclic redundancy check (CRC) for the DCI—is scrambled by the RA-RNTI associated with RACH MsgA 210-*a* for UE 115-*a*. In some cases, UE 115-*a* may decode the DCI to determine whether the scheduled MCS for the corresponding RACH MsgB PDSCH portion matches the indicated modulation order 220, which may be modulation order 220-*a*. If the MCS (i.e., the modulation order 220 for the indicated MCS index) matches modulation order 220-*a*, UE 115-*a* may decode the RACH MsgB PDSCH portion. Otherwise (e.g., if the MCS index indicated in the DCI corresponds to a different modulation order 220 than modulation order 220-*a*), UE 115-*a* may not decode the RACH MsgB PDSCH portion. This may be referred to as suppressing decoding of the RACH MsgB data portion, refraining from decoding the RACH MsgB data portion, early terminating decoding of the RACH MsgB data portion, or the like.

In some cases, base station 105-*a* may override a modulation order report from one or more UEs 115. For example, if a small number of UEs 115 select the same modulation order 220, the base station 105-*a* may improve the signaling efficiency by overriding the modulation order reporting. Base station 105-*a* may include a bit field (e.g., a one-bit indicator) in DCI to indicate whether a modulation order override is used for MsgB PDSCH. For example, modulation order 220-*a* may be 16QAM, while modulation order 220-*b* may be QPSK. In such an example, it may be inefficient for base station 105-*a* to send one MsgB using 16QAM and a separate MsgB using QPSK (e.g., if both of these MsgBs correspond to one UE 115 or a relatively small number of UEs 115 below a threshold number of UEs 115). Instead, base station 105-*a* may override either modulation order 220-*a* or modulation order 220-*b* and instead transmit RARs for both UE 115-*a* and UE 115-*b* in a single RACH MsgB using one of the indicated modulation orders 220 (e.g., the modulation order 220 corresponding to the lower MCS, such as QPSK). If base station 105-*a* transmits a RAR for a UE 115 in a RACH MsgB using a modulation order 220 different from the reported modulation order 220, the base station 105-*a* may use the one-bit indicator in the DCI of the RACH MsgB to notify the UEs 115. For example, the base station 105-*a* may assign the modulation order override bit a first value (e.g., {0}) if there is no override and a second value (e.g., {1}) if there is.

In some examples, UE 115-*a* may indicate modulation order 220-*a* that is the same as modulation order 220-*b* indicated by UE 115-*b*. In some such examples, base station 105-*a* may multiplex the RARs for UE 115-*a* and UE 115-*b* in a same MsgB data portion and may select one or more transmission parameters for the MsgB based on the indicated modulation order 220. For example, base station 105-*a* may transmit the data portion of the MsgB using the indicated modulation order 220 and may indicate this modulation order 220 in the DCI portion of the MsgB. UE 115-*a* and UE 115-*b* detecting the MsgB may decode the DCI portion, determine the indicated modulation order 220, and decode the data portion of the MsgB based on the indicated modulation order 220 matching reported modulation order 220-*a* and modulation order 220-*b*.

Additionally, or alternatively, UE 115-*a* may indicate modulation order 220-*a* different from modulation order 220-*b* indicated by UE 115-*b*. In some cases, base station 105-*a* may multiplex the RARs for UE 115-*a* and UE 115-*b* into separate MsgB data portions for different MsgBs. Base station 105-*a* may transmit a RAR for UE 115-*a* in the data portion of a first MsgB using indicated modulation order 220-*a* and may indicate modulation order 220-*a* in the DCI portion of the first MsgB. Additionally, base station 105-*a* may transmit a RAR for UE 115-*b* in the data portion of a second MsgB using modulation order 220-*b* and may indicate modulation order 220-*b* in the DCI portion of the second MsgB. UE 115-*a* receiving both the first and second MsgBs may decode the DCI portions for each of these MsgBs. UE 115-*a* may determine that the DCI portion for the first MsgB indicates modulation order 220-*a* and may decode the data portion—with the RAR for UE 115-*a*—for the first MsgB based on this indication matching the reported modulation order 220-*a* for UE 115-*a*. However, UE 115-*a* may determine that the DCI portion for the second MsgB indicates modulation order 220-*b* different from modulation order 220-*a* and, accordingly, may not decode the data portion for this second MsgB. UE 115-*a* may experience power and processing savings based on refraining from decoding the data portion for the second MsgB.

In some other cases (e.g., if modulation order 220-*a* and modulation order 220-*b* are different), base station 105-*a* may multiplex the RARs for UE 115-*a* and UE 115-*b* in a same MsgB data portion. To ensure that one of the UEs 115 does not refrain from decoding this data portion containing the RAR for that UE 115, the base station 105-*a* may indicate a modulation order override in the MsgB DCI portion. UE 115-*a* and UE 115-*b* detecting the MsgB may decode the DCI portion, determine the modulation order override, and decode the data portion of the MsgB regardless of the modulation order 220 indicated in the DCI portion of the MsgB. In this way, base station 105-*a* may transmit RARs for UEs 115-*a* and 115-*b* in a MsgB using an MCS index corresponding to modulation order 220-*a* but not modulation order 220-*b*, but UE 115-*b* may still decode the data portion of the MsgB based on the indication of the modulation order override. This modulation order override may trigger a UE 115 to suppress the validation of a modulation order 220 in the DCI portion for decoding a RACH MsgB.

Figure 3:
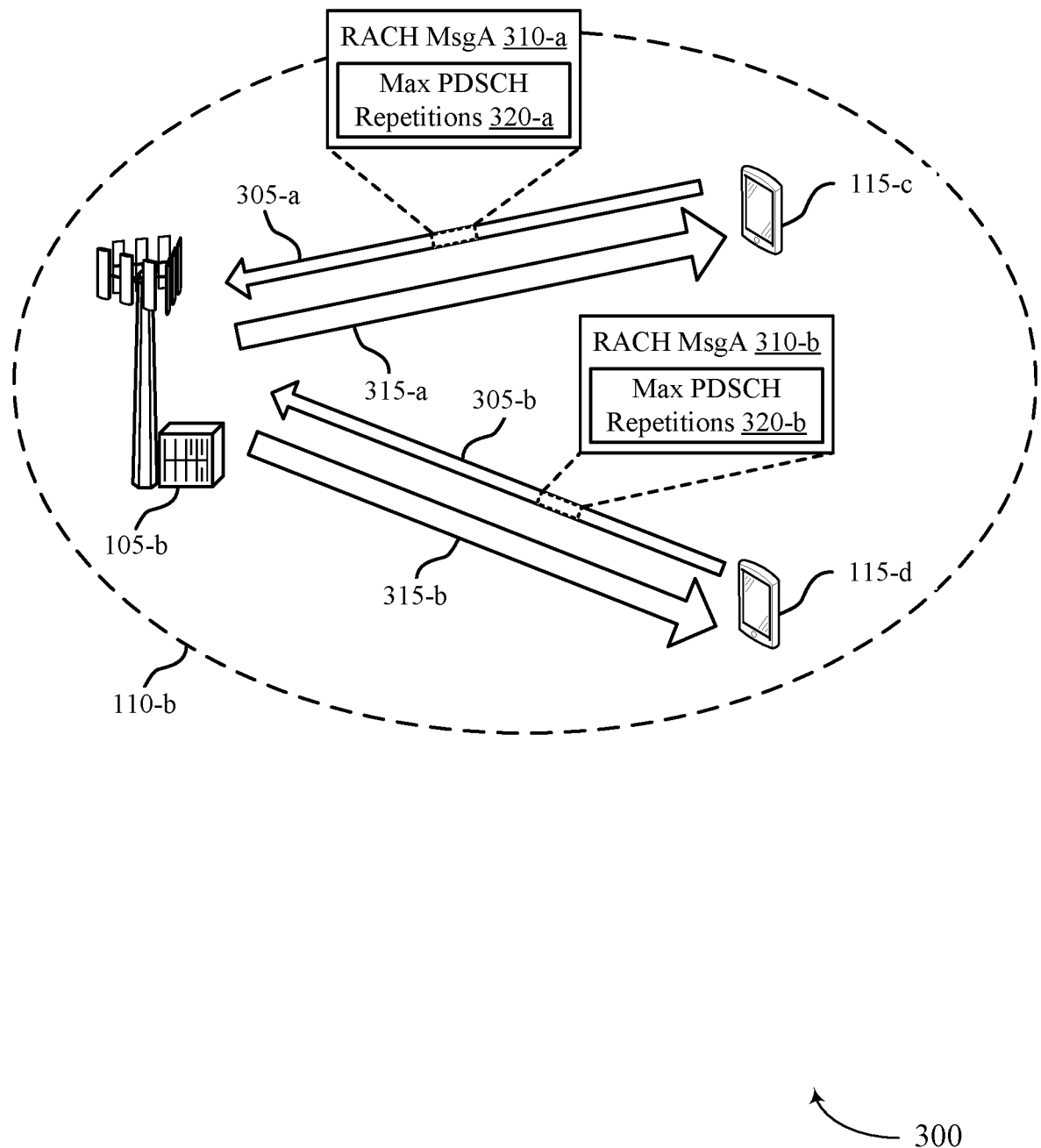

FIG. 3 illustrates an example of a wireless communications system 300 that supports UE-assisted group response for a two-step random access procedure in accordance with aspects of the present disclosure. In some examples, wireless communications system 300 may implement aspects of wireless communications system 100, wireless communications system 200, or both. Wireless communications system 300 may include UE 115-*c*, UE 115-*d*, and base station 105-*b* with coverage area 110-*b*, which may be examples of UEs 115, a base station 105, and a coverage area 110 described with reference to FIGS. 1 and 2. As described herein, UE 115-*c* and UE 115-*d* may initiate two-step RACH procedures by signaling RACH MsgA 310-*a* and RACH MsgA 310-*b* to base station 105-*b*. In some examples, UE 115-c and UE 115-d may indicate maximum number of MsgB PDSCH repetitions 320-a and maximum number of MsgB PDSCH repetitions 320-b in RACH MsgA 310-a and RACH msgA 310-b respectively. Base station 105-b may respond to the RACH MsgAs 310 by transmitting one or more RACH MsgBs based on the indicated maximum numbers of MsgB PDSCH repetitions 320. UEs 115-c and 115-d may transmit RACH MsgA 310-a and RACH MsgA 310-b on uplink channel 305-a and uplink channel 305-b and may receive RACH MsgBs on downlink channel 315-a and downlink channel 315-b respectively.

In some cases, UE 115-c and UE 115-d may initiate two-step RACH procedures by transmitting RACH MsgA 310-a and RACH MsgA 310-b. In response, base station 105-b may transmit one or more RACH MsgBs, including PDCCH portions (e.g., DCI portions) and PDSCH portions. Base station 105-b may support coverage enhancement by transmitting multiple repetitions of a MsgB PDSCH portion (e.g., scheduled by a single MsgB DCI portion). The MsgB DCI may indicate the repetition number for a MsgB PDSCH using a bit field (e.g., two bits in the DCI message) and based on a maximum number of repetitions for MsgB PDSCH. For example, the maximum numbers of MsgB PDSCH repetitions may include the following options of MsgB PDSCH repetition numbers:

TABLE 1

| MsgB PDSCH Repetitions | |
| --- | --- |
| Maximum Number of MsgB PDSCH Repetitions | Set of MsgB PDSCH Repetition Numbers |
| 8 | 1, 2, 4, 8 |
| 16 | 1, 4, 8, 16 |
| 32 (default) | 1, 4, 16, 32 |

Additionally, base station 105-b may support a default maximum number of MsgB PDSCH repetitions. If UE 115-c and UE 115-d have different channel conditions—and, correspondingly, different optimal values for MsgB PDSCH repetition—base station 105-b may not use the same maximum number of MsgB PDSCH repetitions for UE 115-c and UE 115-d, even if these UEs 115 transmit RACH MsgAs 310 in the same RACH occasion. To support UE-assisted RACH MsgB group transmissions, a UE 115 may report a maximum number of MsgB PDSCH repetitions 320 in the MsgA payload (e.g., based on measured downlink channel conditions at the UE 115).

For example, UE 115-c and UE 115-d may indicate maximum number of MsgB PDSCH repetitions 320-a and maximum number of MsgB PDSCH repetitions 320-b in RACH MsgA 310-a and RACH MsgA 310-b, respectively, to base station 105-b. In some cases, if a UE 115 determines to use the default maximum number of repetitions, the UE 115 may refrain from indicating the maximum number of repetitions in the MsgA or may indicate the default value. A UE 115 may report the maximum number of MsgB PDSCH repetitions 320, as opposed to an actual requested repetition number, due to downlink reference signal received power (RSRP) accuracy and flexibility for base station 105-b to multiplex RARs in the RACH MsgBs. In some cases, the UEs 115 may include a bit field (e.g., a two-bit indicator) in the RACH MsgAs 310 to indicate the maximum numbers of MsgB PDSCH repetitions 320. Base station 105-b may use maximum number of MsgB PDSCH repetitions 320-a and maximum number of MsgB PDSCH repetitions 320-b to group RARs in MsgB transmissions.

Base station 105-b may use the DCI portion of a RACH MsgB to indicate whether base station 105-b uses the reported maximum number of MsgB PDSCH repetitions 320 for the scheduled PDSCH portion of the RACH MsgB. In some cases, base station 105-b may use one bit in the DCI to indicate whether base station 105-b uses the reported maximum number of PDSCH repetitions 320 for scheduling the MsgB PDSCH. For example, a first value of the one-bit indicator (e.g., {0}) may indicate the maximum number of PDSCH repetitions 320 is based on reporting by the UE 115, while a second value of the one-bit indicator (e.g., {1}) may indicate that the default maximum number of PDSCH repetitions 320 is used. In some other cases, base station 105-b may use a bit field in the DCI to indicate more granular information about the maximum number of PDSCH repetitions 320. For example, one value (e.g., {00}) may indicate that the MsgB is directed toward a set of UEs 115 not reporting maximum numbers of MsgB PDSCH repetitions 320. These UEs 115 may implicitly use the default maximum number of MsgB PDSCH repetitions 320. A second value (e.g., {01}) may indicate the default maximum number of MsgB PDSCH repetitions 320 and may override the value reported by the UE 115. One or more additional values may correspond to particular maximum numbers of MsgB PDSCH repetitions 320 (e.g., {01} indicating a maximum of 8 repetitions, {11} indicating a maximum of 16 repetitions, etc.). A UE 115 may receive the MsgB DCI portion and may interpret an indicated number of repetitions index based on the determined maximum number of MsgB PDSCH repetitions 320.

In a first example, UE 115-c may report maximum number of MsgB PDSCH repetitions 320-a to base station 105-b that is the same as reported maximum number of MsgB PDSCH repetitions 320-b from UE 115-d. Base station 105-b may multiplex RARs for these UEs 115 into a same MsgB and may indicate for the UEs 115 to use the reported maximum number of MsgB PDSCH repetitions 320 for interpreting the indicated number of repetitions index in the DCI. For example, if the UEs 115 indicate a maximum number of MsgB PDSCH repetitions 320 of 16, and the base station 105-b indicates a number of repetitions index value of 2 (and does not override the UE reporting), the UEs 115 may determine that the RACH MsgB PDSCH is repeated 8 times according to the values in Table 1 (e.g., where the values correspond to the number of repetitions indices 0 to 3).

In a second example, UE 115-c may report maximum number of MsgB PDSCH repetitions 320-a to base station 105-b that is different than reported maximum number of MsgB PDSCH repetitions 320-b from UE 115-d. Base station 105-b may multiplex the RARs for UE 115-c and UE 115-d into different MsgB PDSCHs based on the different maximum numbers of repetitions. Base station 105-b may indicate maximum number of MsgB PDSCH repetitions 320-a in the DCI for a first MsgB and may indicate maximum number of MsgB PDSCH repetitions 320-b in a second MsgB. UE 115-c may terminate decoding for the second MsgB early and UE 115-d may terminate decoding for the first MsgB early based on the indicated maximum numbers of MsgB PDSCH repetitions 320 in the DCIs.

In a third example where the indicated maximum number of MsgB PDSCH repetitions 320-a and maximum number of MsgB PDSCH repetitions 320-b are different, base station 105-b may multiplex RARs for these UEs 115 into a same MsgB and may indicate for the UEs 115 not to use the reported maximum numbers of MsgB PDSCH repetitions 320. For example, indicated maximum number of MsgB PDSCH repetitions 320-*a* may be 8, indicated maximum number of MsgB PDSCH repetitions 320-*b* may be 16, and base station 105-*b* may indicate, in the DCI portion of the MsgB, to use a default maximum number of MsgB PDSCH repetitions 320 of 32. As such, the UEs 115 may interpret a number of repetitions index value of 2 to mean that the MsgB PDSCH portion is repeated 16 times (e.g., according to Table 1).

In some cases, UEs 115 may report both a modulation order 220 (e.g., as described with reference to FIG. 2) and a maximum number of MsgB PDSCH repetitions 320 (e.g., as described with reference to FIG. 3) in a RACH MsgA. A base station 105 may use a combination of the techniques described herein with reference to FIGS. 2 and 3 to send RACH MsgBs in response to such a RACH MsgA. For example, base station 105-*b* may multiplex RARs into different MsgBs based on the indicated modulation orders. Base station 105-*b* may further multiplex RARs into different MsgBs based on the indicated maximum numbers of repetitions (e.g., for QPSK modulation). In other examples, the base station 105 may determine whether to group RARs based on modulation orders or maximum numbers of repetitions based on the distribution of RARs between MsgBs. In such other examples, the baes station 105 may indicate which factor is used for grouping RARs in the MsgB DCI.

Figure 4:
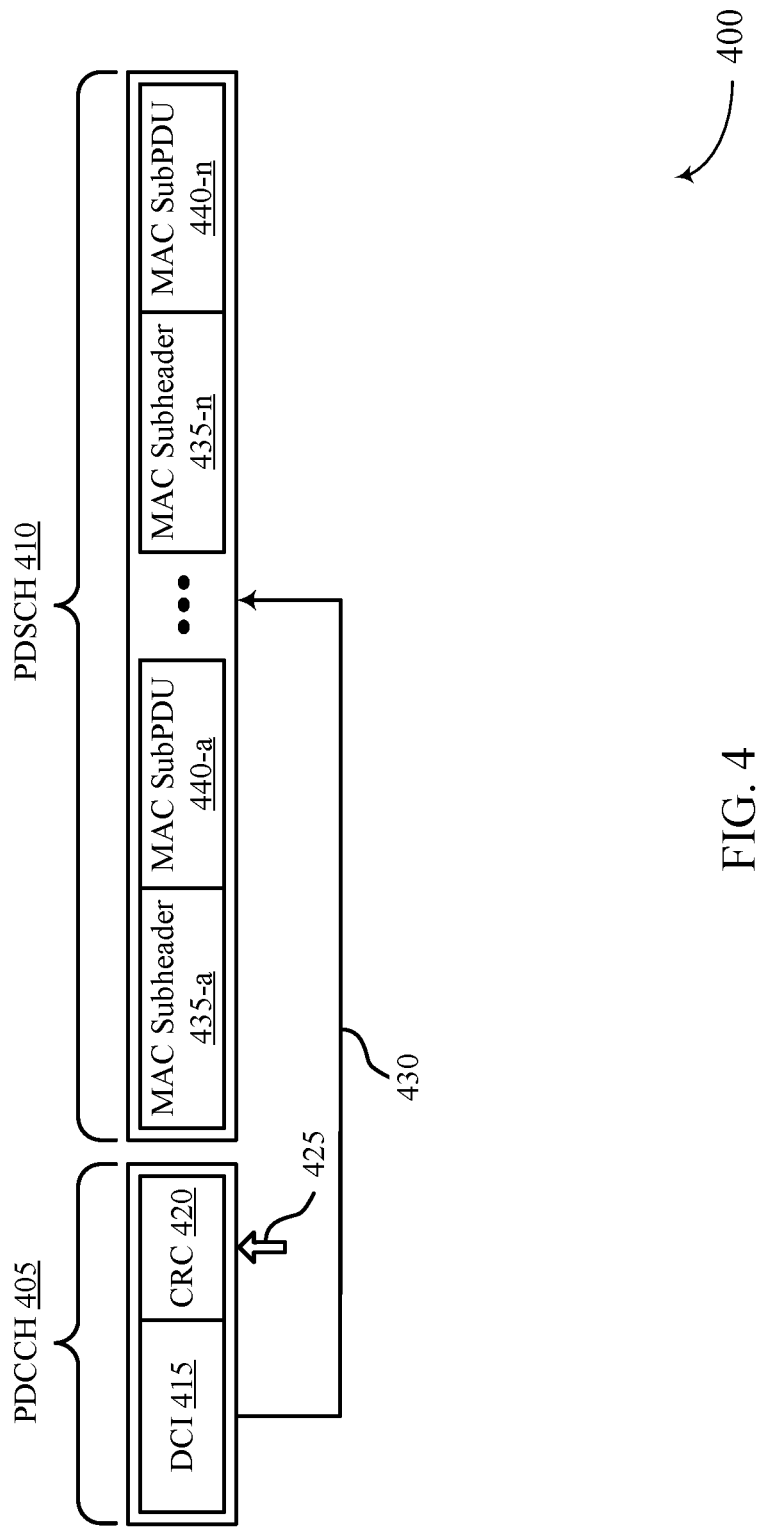
FIG. 4 illustrates an example of a RACH MsgB channel structure that supports UE-assisted group response for a two-step random access procedure in accordance with aspects of the present disclosure.

FIG. 4 illustrates an example of a RACH MsgB channel structure 400 that supports UE-assisted group response for a two-step random access procedure in accordance with aspects of the present disclosure. In some examples, the RACH MsgB channel structure 400 may implement aspects of wireless communications system 100, wireless communications system 200, wireless communications system 300, or a combination thereof. The RACH MsgB channel structure 400 may include a PDCCH 405 portion and PDSCH 410 portion.

In some cases, MsgB PDCCH 405 may include DCI 415 and a CRC 420 for the DCI 415. At 425, a base station 105 generating the RACH MsgB may use the MsgB RNTI or cell radio network temporary identifier (C-RNTI) to scramble the CRC 420. An indication 430 in the MsgB PDCCH 405 may schedule a corresponding MsgB PDSCH 410. The corresponding PDSCH 410 may include a first MAC sub-header 435-*a* and a first MAC sub-PDU 440-*a*. The MsgB PDSCH 410 may include any number of MAC sub-headers (e.g., up to a MAC sub-header 435-*n*) and any number of MAC Sub-PDUs (e.g., up to a MAC sub-PDU 440-*n*).

In some cases, the base station 105 may aggregate multiple RARs belonging to different UEs 115 in one MsgB PDSCH (e.g., PDSCH 410). The RAR may be a SuccessRAR or a FallbackRAR. For example, a SuccessRAR may facilitate contention resolution and completion of the RACH procedure if the MsgA transmission is received successfully at the base station 105. A FallbackRAR may include a request for re-transmission of the MsgA payload on granted resources if the MsgA preamble detection is successful but the MsgA payload decoding fails at the base station 105.

In some cases, a UE 115 may continuously monitor a PDCCH within a RAR window until successfully receiving a desired RAR (i.e., the RAR intended for the UE 115). The UE 115 may be able to identify that a MsgB PDSCH 410 does not include a RAR for the UE 115 without decoding the MsgB PDSCH 410 if the MsgB is based on the reported information from the UE 115 (e.g., a modulation order, a maximum number of repetitions for receiving MsgB, or both). For example, the UE 115 may decode the MsgB PDCCH 405 and may determine whether to decode the MsgB PDSCH 410 based on if the information in the decoded MsgB PDCCH 405 matches the reported information.

Additionally, or alternatively, the UE 115 may terminate monitoring of MsgB PDCCH 405 early (e.g., before the end of a RAR window) based on either an explicit or implicit indication by the DCI 415. In an explicit indication, a base station 105 may use a one-bit indicator in the DCI specifying a last MsgB for a RAR window corresponding to the indicated modulation order or maximum number of repetitions (e.g., for all UEs 115 or a group of UEs 115). UEs 115 may stop monitoring the PDCCH for the rest of the RAR window after such a MsgB and may re-transmit RACH messages (or enter low power consumption states). In an implicit indication, a UE 115 may early terminate monitoring based on whether or not the base station 105 overrides the reporting from the UE 115. For example, if the base station 105 does not override the UE 115 reporting, and the UE 115 receives a MsgB corresponding to the UE 115 (e.g., based on the reported information) that does not contain a RAR for the UE 115, the UE 115 may stop monitoring the RAR window and may re-transmit a RACH MsgA or fall back to transmit a RACH Msg1.

Figure 5:
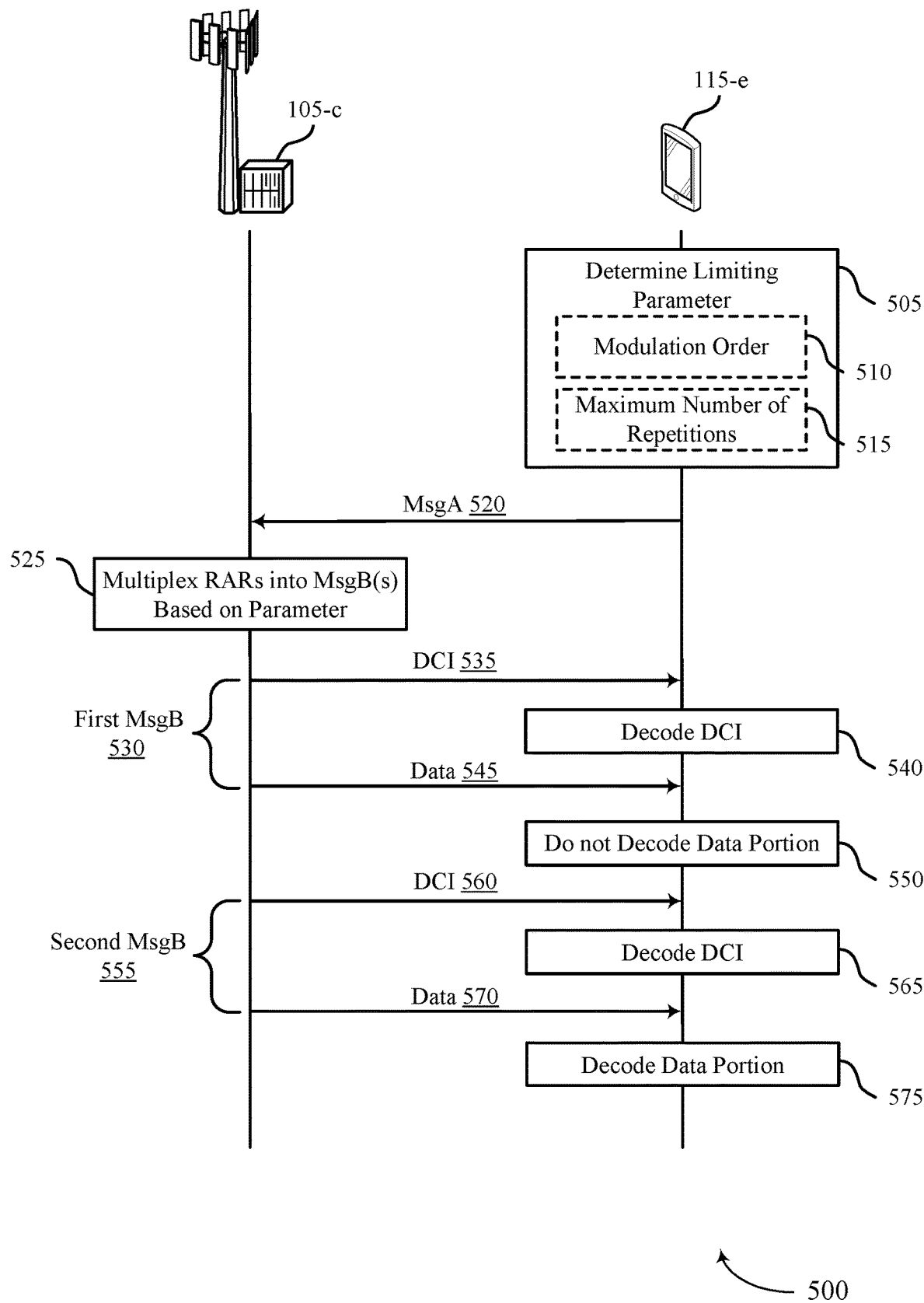
FIG. 5 illustrates an example of a process flow that supports UE-assisted group response for a two-step random access procedure in accordance with aspects of the present disclosure.

FIG. 5 illustrates an example of a process flow 500 that supports UE-assisted group response for a two-step random access procedure in accordance with aspects of the present disclosure. The process flow 500 may be an example of a two-step RACH procedure between base station 105-*c* and UE 115-*e*, which may be examples of a base station 105 and a UE 115 described with reference to FIGS. 1 through 4. Alternative examples of the following may be implemented, where some processes are performed in a different order than described or are not performed. In some cases, processes may include additional features not mentioned below, or further processes may be added.

At 505, UE 115-*e* may determine a limiting parameter for the RACH procedure. For example, at 510, UE 115-*e* may select a modulation order for receiving a second message for the RACH procedure from base station 105-*c*. The modulation order may be QPSK, 16QAM, 64QAM, 256QAM, or another modulation order. Additionally, or alternatively, at 515, UE 115-*e* may select a maximum number of repetitions for MsgB data (which may be referred to simply as a "maximum number of repetitions"). Although one UE 115 is illustrated in FIG. 5, there may be any number of UEs 115 in communication with base station 105-*c*. Similar to UE 115-*e*, each UE 115 may select a modulation order or a maximum number of repetitions (e.g., based on downlink channel measurements).

At 520, UE 115-*e* may transmit a first message (e.g., MsgA) in the two-step RACH procedure. UE 115-*e* may include an indication of the limiting parameter, for example a two-bit indication of a modulation order or a maximum number of repetitions for the second message (e.g., MsgB), in the first message. The first message may include a preamble and a data payload. Although UE 115-*e* transmits MsgA to one base station 105-*c*, UE 115-*e* may transmit additional first messages (e.g., similar to MsgA at 520) to additional base stations. The additional first messages may indicate different modulation orders or the same modulation order. Although not shown, UE 115-*e* may perform a similar process to process flow 500 between any additional base stations 105.

At 525, base station 105-*c* may receive multiple first messages (e.g., multiple MsgAs, such as the MsgA for UE 115-*e* received at 520) from a set of UEs 115 initiating two-step RACH procedures with base station 105-*c*. The first messages may contain the parameter information associated with downlink reception at the set of UEs 115. Base station 105-c may multiplex a set of RARs into data portions of one or more second messages (e.g., one or more MsgBs) in the two-step RACH procedure. Base station 105-c may multiplex the RARs based on a modulation order, maximum number of repetitions, or both. For example, base station 105-c may multiplex a first subset of RARs into a data portion of a first MsgB and may multiplex a second subset of RARs into a data portion of a second MsgB based on modulation order, maximum number of repetitions, or both.

At 530, base station 105-c may transmit a second message for the RACH procedure (e.g., a first MsgB) to UE 115-e. The first MsgB may include a DCI in the PDCCH and data in the PDSCH. At 535, base station 105-c may transmit the DCI portion of the first MsgB, which may indicate a first modulation order, a first maximum number of repetitions, or both. At 540, UE 115-e may decode the DCI received at 535. In some cases, the first message (e.g., MsgA) may be associated with an RA-RNTI. UE 115-e may decode the DCI at 540 based on unscrambling the DCI—or a CRC for the DCI—with the RA-RNTI associated with the RACH MsgA transmission by UE 115-e. At 545, base station 105-c may transmit the data portion of the first MsgB from 530. At 550, UE 115-e may not decode (e.g., suppress decoding, terminate decoding, refrain from decoding, etc.) the data portion of the MsgB transmitted at 545 based on decoding the DCI at 540. For example, if UE 115-e determines that a parameter for the first MsgB does not match the parameter determined at 505 and indicated in the MsgA, UE 115-e may not decode the data portion of the MsgB at 550. In some cases, the DCI decoded at 540 may indicate no suppression of validation of the parameter for the data portion (e.g., no override of the modulation order check, the maximum number of repetitions check, or both), in which case UE 115-e may refrain from decoding the MsgB data at 550 if the modulation orders, maximum numbers of repetitions, or both do not match.

At 555, base station 105-c may send an additional second message (e.g., a second MsgB) for the RACH procedure. The additional second message may include a DCI portion and a data portion. At 560, UE 115-e may receive the additional DCI portion of the additional second message. At 565, UE 115-e may decode the DCI of the additional second message (e.g., the second MsgB) to determine whether to decode the data portion transmitted at 570. If the DCI of the second MsgB matches the parameter determined at 505 and indicated in the MsgA, UE 115-e may decode the data portion of the second MsgB at 575. Additionally, or alternatively, if base station 105-c overrides the modulation order check, the maximum number of repetitions check, or both, UE 115-e may decode the data portion at 575 regardless of the modulation order, maximum number of repetitions, or both indicated in the decoded DCI.

Figure 6:
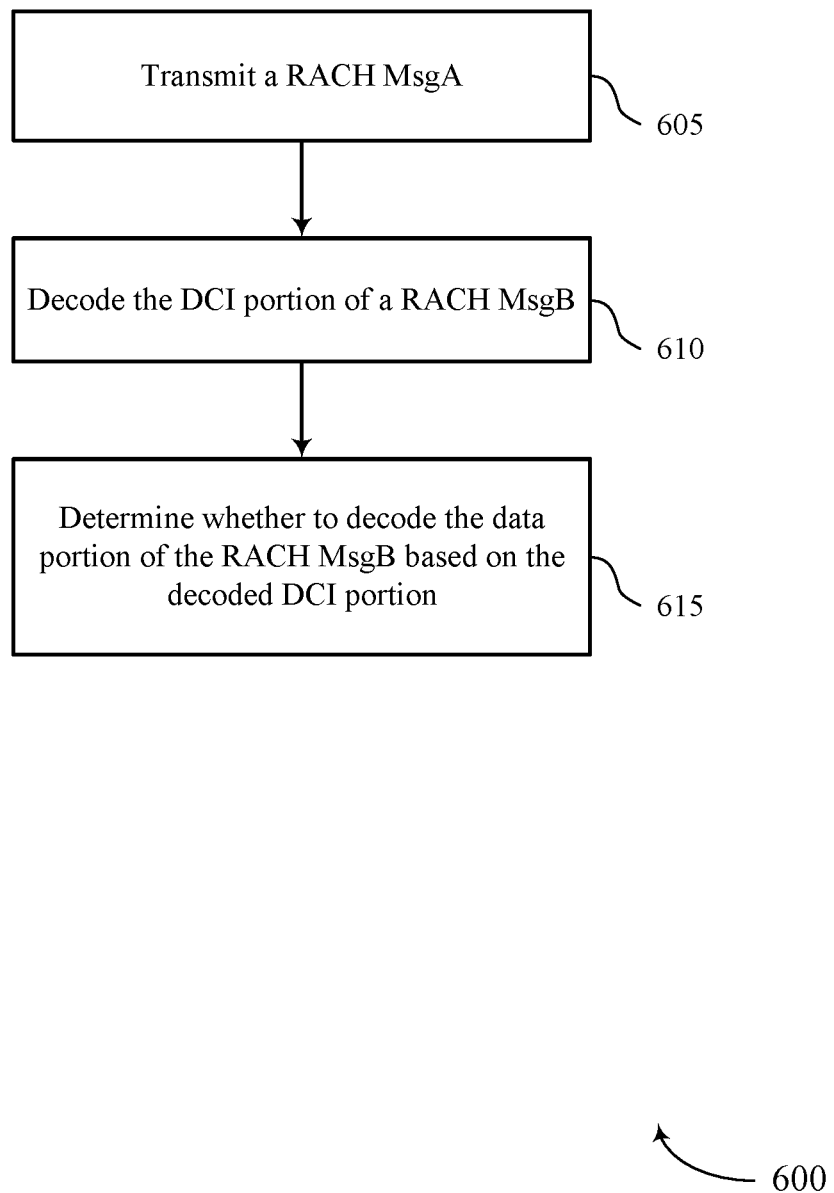
FIG. 6 illustrates an example of a flowchart illustrating a method that supports UE-assisted group response for a two-step random access procedure in accordance with aspects of the present disclosure.

FIG. 6 illustrates an example of a flowchart illustrating a method 600 that supports UE-assisted group response for a two-step random access procedure in accordance with aspects of the present disclosure. In some examples, the method 600 may be performed by a UE 115 as described herein with reference to FIGS. 1 through 5.

At 605, a UE 115 may transmit a first message in a two-step RACH procedure, which may be referred to as a MsgA. The MsgA may indicate a first order of modulation or a first maximum number of repetitions for MsgB data.

At 610, the UE 115 may decode a DCI portion of a second message in a two-step RACH procedure, which may be referred to as a MsgB. The MsgB may include a DCI portion and a data portion, where the data portion may include one or more RARs multiplexed together for one or more UEs 115. The DCI may indicate to the UE 115 a second order of modulation or a second maximum number of repetitions for MsgB data. In some cases, the DCI may include an indication as to whether the base station 105 overrides the UE 115 reported value(s) (e.g., the first order of modulation, the first maximum number of repetitions, or both).

At 615, the UE 115 may determine whether to decode the data portion of the second message (e.g., the MsgB) in the two-step RACH procedure. In some cases, the UE 115 may determine whether to decode the MsgB based on the decoded DCI portion. For example, the decoded DCI portion may indicate a modulation order different from the first modulation order or a maximum number of repetitions different from the first maximum number of repetitions, and the UE 115 may not decode the data portion based on this discrepancy. In some other examples (e.g., if the modulation orders or maximum numbers of repetitions match, if the base station 105 overrides the modulation order check or the maximum number of repetitions check, etc.), the UE 115 may decode the data portion.

Figure 7:
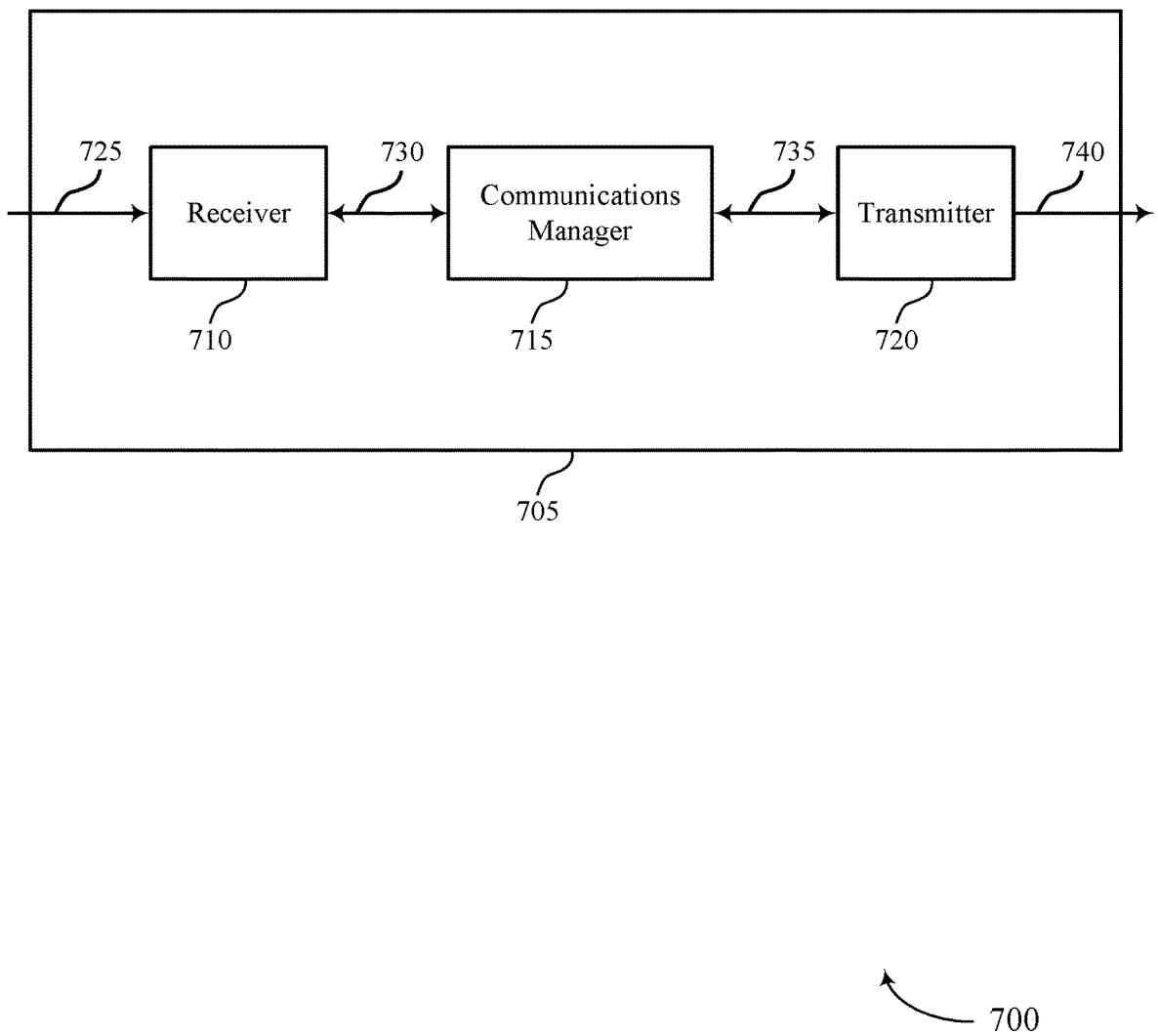
FIGS. 7 and 8 show block diagrams of devices that support UE-assisted group response for a two-step random access procedure in accordance with aspects of the present disclosure.

FIG. 7 shows a block diagram 700 of a device 705 that supports UE-assisted group response for a two-step random access procedure in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information 725 such as packets, user data, or control information associated with various information channels (e.g., control channels, data channels, and information related to UE-assisted RACH MsgB group transmission, etc.). Information 730 may be passed on to other components of the device 705. The receiver 710 may be an example of aspects of the transceiver 1020 described with reference to FIG. 10. The receiver 710 may utilize a single antenna or a set of antennas.

In some implementations, the communications manager 715 may transmit, to a base station in a first message for a RACH procedure, an indication of a first modulation order for receiving a second message for the RACH procedure from the base station, receive, from the base station, a DCI portion of the second message, and decode the second message based on the DCI portion indicating the first modulation order, or indicating suppression of validation of a modulation order for a data portion of the second message, or both, including decoding the DCI portion of the second message and decoding the data portion of the second message.

Additionally, or alternatively, the communications manager 715 may transmit, to a base station in a first message for a RACH procedure, an indication of a first maximum number of repetitions for receiving a second message for the RACH procedure, receive, from the base station, a DCI portion of the second message, and decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message. The communications manager 715 may be an example of aspects of the communications manager 1010 described herein.

The actions performed by the communications manager 715 as described herein may be implemented to realize one or more potential advantages. One implementation may enable a base station to group RARs for UEs in a two-step RACH procedure. The base station may transmit a MsgB including the grouped RARs to UEs according to reported information, such as a modulation order, which may improve communication latency (e.g., as compared to individual transmissions of RARs), among other advantages.

Based on implementing the RAR grouping as described herein, a processor of a UE or a base station (e.g., a processor controlling the receiver 710, the communications manager 715, the transmitter 720, or a combination thereof) may reduce the impact or likelihood of inefficient communications due to unnecessary decoding of a MsgB transmission. For example, the UE may decode the MsgB transmitted using a modulation order for the UE and may terminate decoding early for other MsgBs transmitted using different modulation orders, which may realize power savings at the UE, among other benefits. Terminating decoding early may reduce an amount of time for which a processor of the UE ramps up processing power and turns on processing units to handle decoding procedures.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals 740 generated by other components of the device 705 (e.g., based on information 735). In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
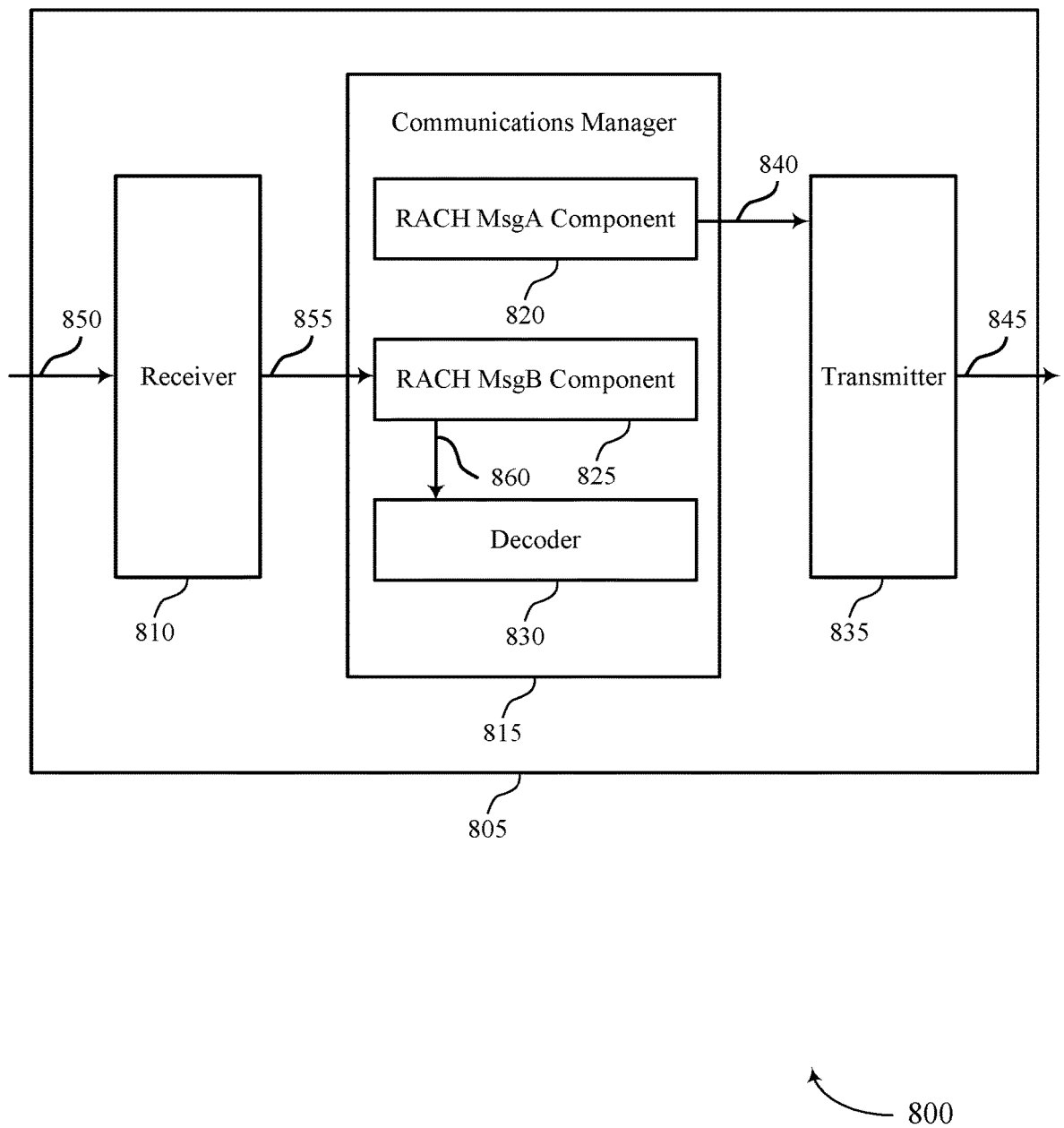

FIG. 8 shows a block diagram 800 of a device 805 that supports UE-assisted group response for a two-step random access procedure in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information 850 such as packets, user data, or control information associated with various information channels (e.g., control channels, data channels, and information related to UE-assisted RACH MsgB group transmission, etc.). Information may be passed on to other components of the device 805. The receiver 810 may be an example of aspects of the transceiver 1020 described with reference to FIG. 10. The receiver 810 may utilize a single antenna or a set of antennas. The receiver 810 may pass information 855, such as signal information or sets of decoded bits, to communications manager 815 for processing.

The communications manager 815 may be an example of aspects of the communications manager 715 as described herein. The communications manager 815 may include a RACH MsgA component 820, a RACH MsgB component 825, and a decoder 830. The communications manager 815 may be an example of aspects of the communications manager 1010 described herein.

The RACH MsgA component 820 may transmit, to a base station in a first message for a RACH procedure, an indication of a first modulation order for receiving a second message for the RACH procedure from the base station. For example, the RACH MsgA component 820 may prepare a payload 840 for transmission in the first message for the RACH procedure. The payload 840 may include information bits indicating the first modulation order. The RACH MsgA component 820 may send the payload 840 for transmission by the transmitter 835 in a signal 845.

The RACH MsgB component 825 may receive, from the base station, a DCI portion of the second message. For example, the receiver 810 may receive information 850 over a channel (e.g., a PDCCH). In some examples, the receiver 810 may send the information 850 as information 855 to the RACH MsgB component 825, which may pass the information 860 to the decoder 830 for decoding. In some other examples, the RACH MsgB component 825, the decoder 830, or both may be implemented as components of the receiver 810.

The decoder 830 may decode the second message based on the DCI portion indicating the first modulation order, or indicating suppression of validation of a modulation order for a data portion of the second message, or both, including decoding the DCI portion of the second message and decoding the data portion of the second message. For example, the decoder 830 may perform a decoding procedure on the information 860 received at the decoder 830 to determine a set of information bits corresponding to the DCI portion of the second message for the RACH procedure, the data portion of the second message for the RACH procedure, or both.

Additionally, or alternatively, the RACH MsgA component 820 may transmit, to a base station in a first message for a RACH procedure, an indication of a first maximum number of repetitions for receiving a second message for the RACH procedure. For example, the RACH MsgA component 820 may be a component of the transmitter 835 or may communicate with the transmitter 835 to send the first message for the RACH procedure in a signal 845. The RACH MsgB component 825 may receive, from the base station, a DCI portion of the second message. The decoder 830 may decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message. The RACH MsgB component 825, the decoder 830, or both may be components of the receiver 810 or may communicate with the receiver 810 to determine information 850 sent over a channel and decode the information 850.

The transmitter 835 may transmit signals 845 generated by other components of the device 805 (e.g., payload 840 for transmission). In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
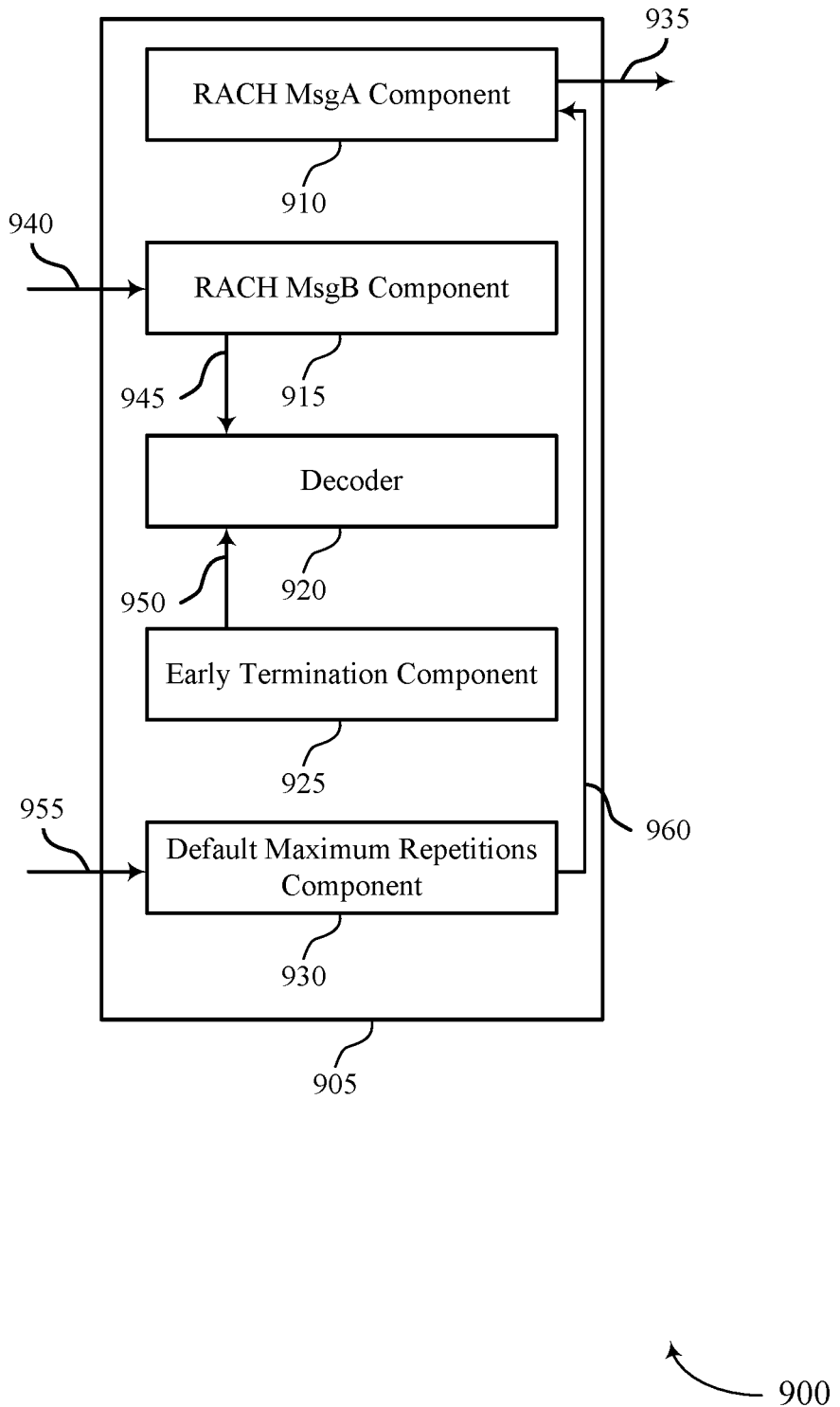
FIG. 9 shows a block diagram of a communications manager that supports UE-assisted group response for a two-step random access procedure in accordance with aspects of the present disclosure.

FIG. 9 shows a block diagram 900 of a communications manager 905 that supports UE-assisted group response for a two-step random access procedure in accordance with aspects of the present disclosure. The communications manager 905 may be an example of aspects of a communications manager 715, a communications manager 815, or a communications manager 1010 described herein. The communications manager 905 may include a RACH MsgA component 910, a RACH MsgB component 915, a decoder 920, an early termination component 925, and a default maximum repetitions component 930. Each of these components may communicate, directly or indirectly, with one another (e.g., via one or more buses).

In some implementations, the RACH MsgA component 910 may transmit, to a base station in a first message for a RACH procedure, an indication of a first modulation order for receiving a second message for the RACH procedure from the base station. For example, the RACH MsgA component 910 may be coupled with or a component of a transmitter or transceiver. The RACH MsgA component 910 may determine a set of bits corresponding to the first message for transmission, where the set of bits indicates the first modulation order. The RACH MsgA component 910 may modulate the first message for the RACH procedure over a set of time-frequency resources for transmission and may transmit the first message as a signal 935. In some cases, the indication of the first modulation order in the first message includes a bit field in a PHY layer signaling message, a MAC CE, or both. In some cases, the first modulation order includes QPSK, 16QAM, 64QAM, or 256QAM.

The RACH MsgB component 915 may receive, from the base station, a DCI portion of the second message. For example, the RACH MsgB component 915 may be coupled with or a component of a receiver or transceiver. The RACH MsgB component 915 may receive a signal 940 corresponding to the DCI portion of the second message. The RACH MsgB component 915 may send information 945 associated with the signal 940 to the decoder 920 for decoding. The decoder 920 may decode the second message based on the DCI portion indicating the first modulation order, or indicating suppression of validation of a modulation order for a data portion of the second message, or both, including decoding the DCI portion of the second message and decoding the data portion of the second message. In some cases, the decoded DCI portion includes a bit field indicating an MCS and the data portion is decoded based on the MCS corresponding to the first modulation order. In some other cases, the decoded DCI portion includes a one bit indicator indicating that the validation of the modulation order for the data portion is suppressed and the data portion is decoded based on the one bit indicator. The decoder 920 may be coupled with or a component of a receiver or transceiver. The decoder 920 may output one or more sets of decoded information bits for processing.

In some examples, the RACH MsgB component 915 may receive, from the base station, an additional DCI portion of an additional second message for the RACH procedure. The early termination component 925 may decode the additional second message based on the additional DCI portion indicating a second modulation order different from the first modulation order, including decoding the additional DCI portion of the additional second message and not decoding an additional data portion of the additional second message. For example, the early termination component 925 may be coupled with or a component of the decoder 920. The early termination component 925 may trigger early termination of a decoding process at the decoder 920. For example, the early termination component 925 may send an indication 950 to the decoder 920 to terminate decoding, such that the additional data portion of the additional second message is not decoded. In some cases, the additional data portion is not decoded further based on the decoded additional DCI portion indicating no suppression of the validation of the modulation order for the additional data portion.

Additionally, or alternatively, in some implementations, the RACH MsgA component 910 may transmit, to a base station in a first message for a RACH procedure, an indication of a first maximum number of repetitions for receiving a second message for the RACH procedure. In some cases, the indication of the first maximum number of repetitions in the first message includes a bit field in a PHY layer signaling message, a MAC CE, or both.

The RACH MsgB component 915 may receive, from the base station, a DCI portion of the second message. The decoder 920 may decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message. In some cases, the decoded DCI portion includes a one bit indicator indicating that the maximum number of repetitions for the repeated data portion corresponds to the first maximum number of repetitions indicated in the first message and the repeated data portion is decoded based on the one bit indicator. In some cases, the decoded DCI portion includes a bit field indicating the maximum number of repetitions for the repeated data portion and the repeated data portion is decoded based on the maximum number of repetitions for the repeated data portion indicated by the bit field being equal to the first maximum number of repetitions indicated in the first message. In some cases, the decoded DCI portion includes a bit field indicating that the validation of the maximum number of repetitions for the repeated data portion is suppressed and the repeated data portion is decoded based on the bit field.

In some examples, the RACH MsgB component 915 may receive, from the base station, an additional DCI portion of an additional second message for the RACH procedure. The early termination component 925 may decode the additional second message based on the additional DCI portion indicating a second maximum number of repetitions different from the first maximum number of repetitions, including decoding the additional DCI portion of the additional second message and not decoding an additional repeated data portion of the additional second message. In some cases, the additional repeated data portion is not decoded further based on the decoded additional DCI portion indicating no suppression of the validation of the maximum number of repetitions for the additional repeated data portion.

In some examples, the RACH MsgB component 915 may receive, from the base station, an additional DCI portion of an additional second message for the RACH procedure. The early termination component 925 may decode the additional second message based on the additional DCI portion indicating no repetitions for an additional data portion, including decoding the additional DCI portion of the additional second message and not decoding the additional data portion of the additional second message.

The default maximum repetitions component 930 may receive, from the base station, an indication of a default maximum number of repetitions for receiving the second message, where the indication of the first maximum number of repetitions is transmitted in the first message based on the first maximum number of repetitions being different from the default maximum number of repetitions. For example, the default maximum repetitions component 930 may be coupled with or a component of a transmitter or transceiver. The default maximum repetitions component 930 may receive a signal 955 representing a message indicating the default maximum number of repetitions. The default maximum repetitions component 930 may send an indication 960 of the default maximum number of repetitions to the RACH MsgA component 910. If the RACH MsgA component 910 determines a first maximum number of repetitions for a second RACH message that is different from the indicated default maximum number of repetitions, the RACH MsgA component 910 may include an indication of the first maximum number of repetitions in the first message for the RACH procedure.

Figure 10:
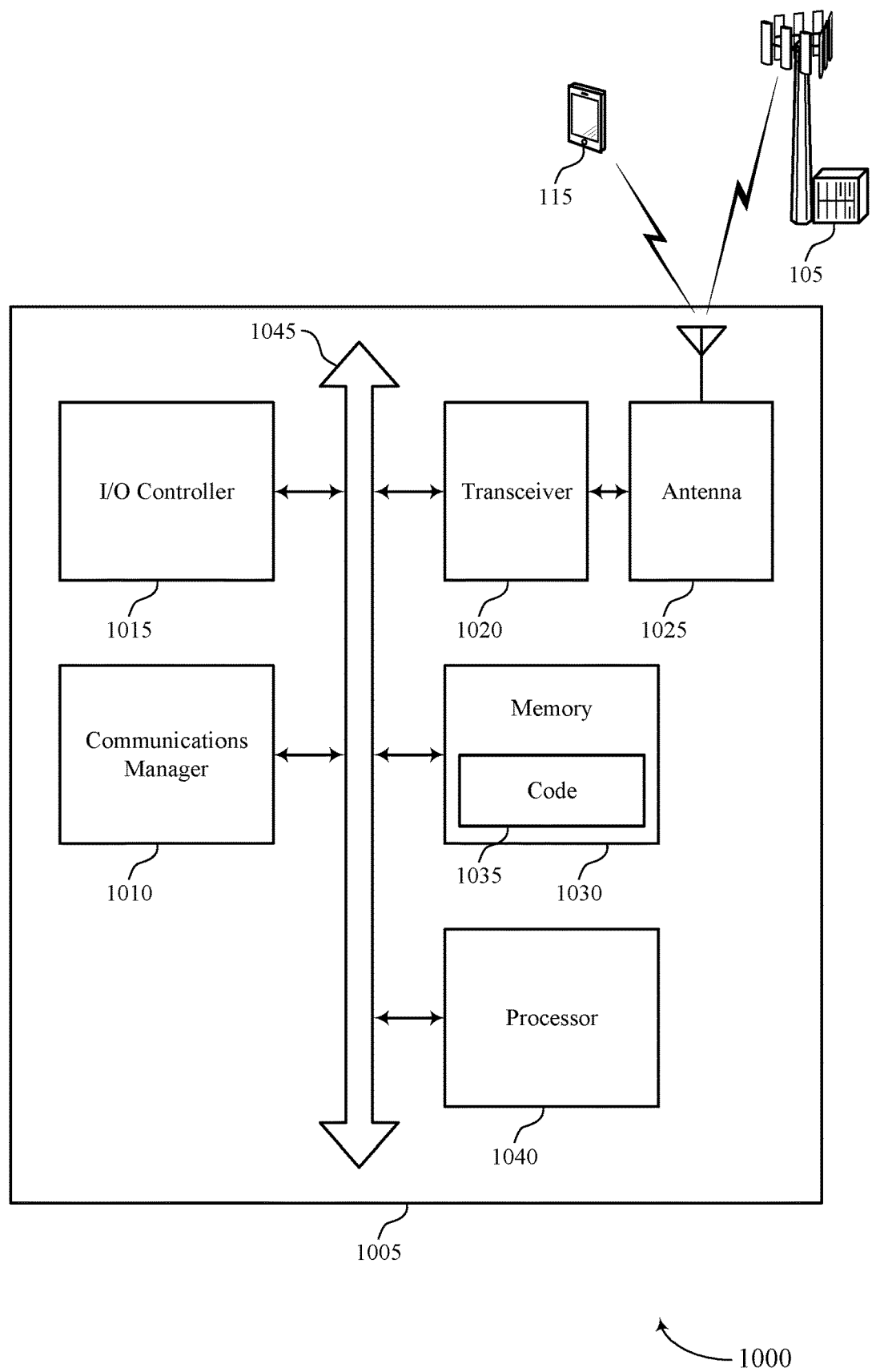
FIG. 10 shows a diagram of a system including a device that supports UE-assisted group response for a two-step random access procedure in accordance with aspects of the present disclosure.

FIG. 10 shows a diagram of a system 1000 including a device 1005 that supports UE-assisted group response for a two-step random access procedure in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit, to a base station in a first message for a RACH procedure, an indication of a first modulation order for receiving a second message for the RACH procedure from the base station, receive, from the base station, a DCI portion of the second message, and decode the second message based on the DCI portion indicating the first modulation order, or indicating suppression of validation of a modulation order for a data portion of the second message, or both, including decoding the DCI portion of the second message and decoding the data portion of the second message. Additionally, or alternatively, the communications manager 1010 may transmit, to a base station in a first message for a RACH procedure, an indication of a first maximum number of repetitions for receiving a second message for the RACH procedure, receive, from the base station, a DCI portion of the second message, and decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UE-assisted RACH MsgB group transmission).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
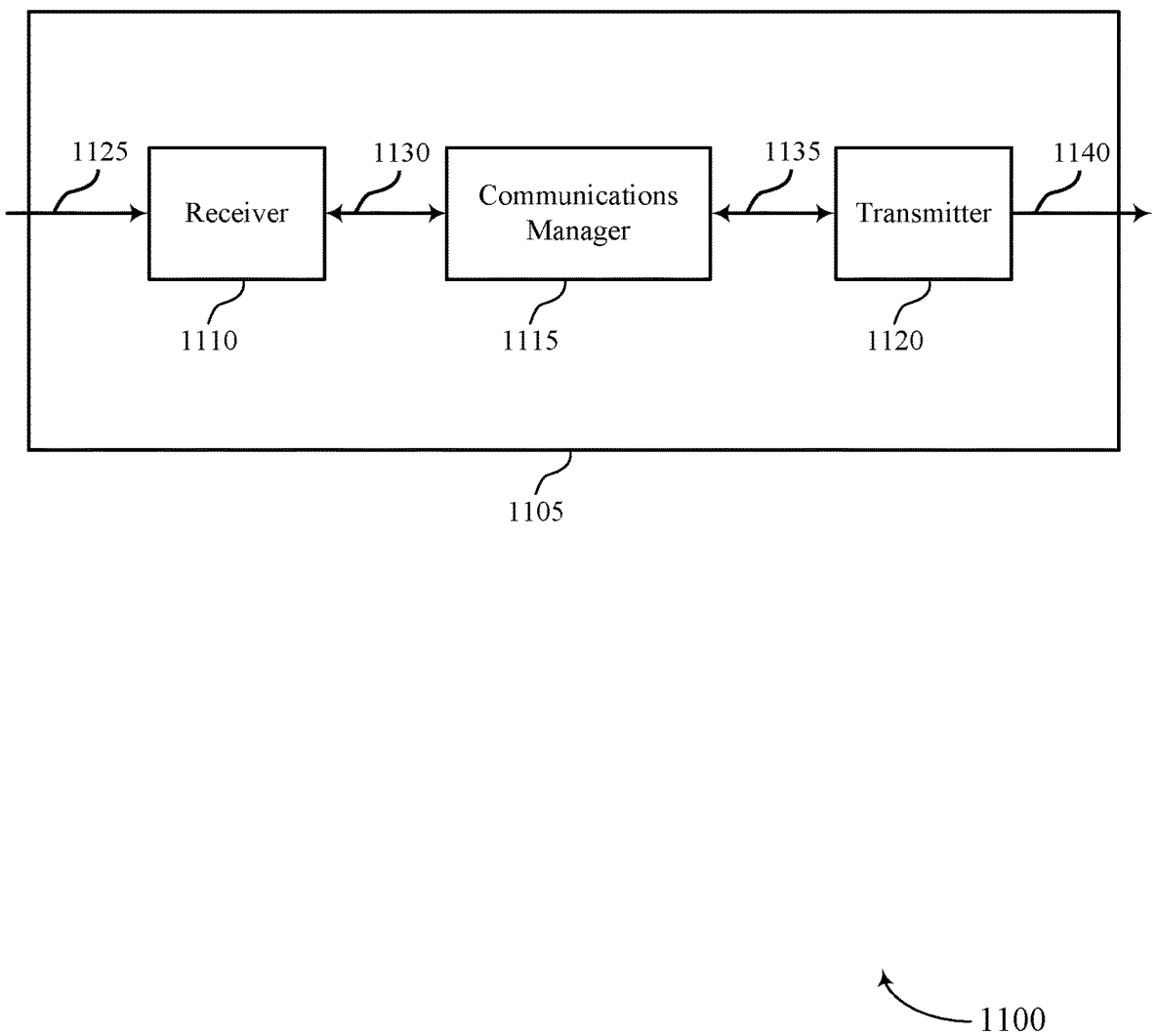
FIGS. 11 and 12 show block diagrams of devices that support UE-assisted group response for a two-step random access procedure in accordance with aspects of the present disclosure.

FIG. 11 shows a block diagram 1100 of a device 1105 that supports UE-assisted group response for a two-step random access procedure in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information 1125 such as packets, user data, or control information associated with various information channels (e.g., control channels, data channels, and information related to UE-assisted RACH MsgB group transmission, etc.). Information 1130 may be passed on to other components of the device 1105. The receiver 1110 may be an example of aspects of the transceiver 1420 described with reference to FIG. 14. The receiver 1110 may utilize a single antenna or a set of antennas.

In some cases, the communications manager 1115 may receive, from a set of UEs in a set of first messages for RACH procedures, a set of indications of respective modulation orders associated with reception of one or more second messages for the RACH procedures at the set of UEs, multiplex a set of RACH responses for the set of UEs into one or more data portions for the one or more second messages based on the respective modulation orders, and transmit, to the set of UEs, the one or more second messages, where each second message of the one or more second messages includes a respective DCI portion indicating a modulation order and a respective data portion of the one or more data portions. Additionally, or alternatively, the communications manager 1115 may also receive, from a set of UEs in a set of first messages for RACH procedures, a set of indications of respective maximum numbers of repetitions associated with reception of one or more second messages for the RACH procedures at the set of UEs, multiplex a set of RACH responses for the set of UEs into one or more repeated data portions for the one or more second messages based on the respective maximum numbers of repetitions, and transmit, to the set of UEs, the one or more second messages, where each second message of the one or more second messages includes a respective DCI portion indicating a maximum number of repetitions and a respective repeated data portion of the one or more repeated data portions. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals 1140 generated by other components of the device 1105 (e.g., information 1135 generated by the communications manager 1115 for transmission). In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
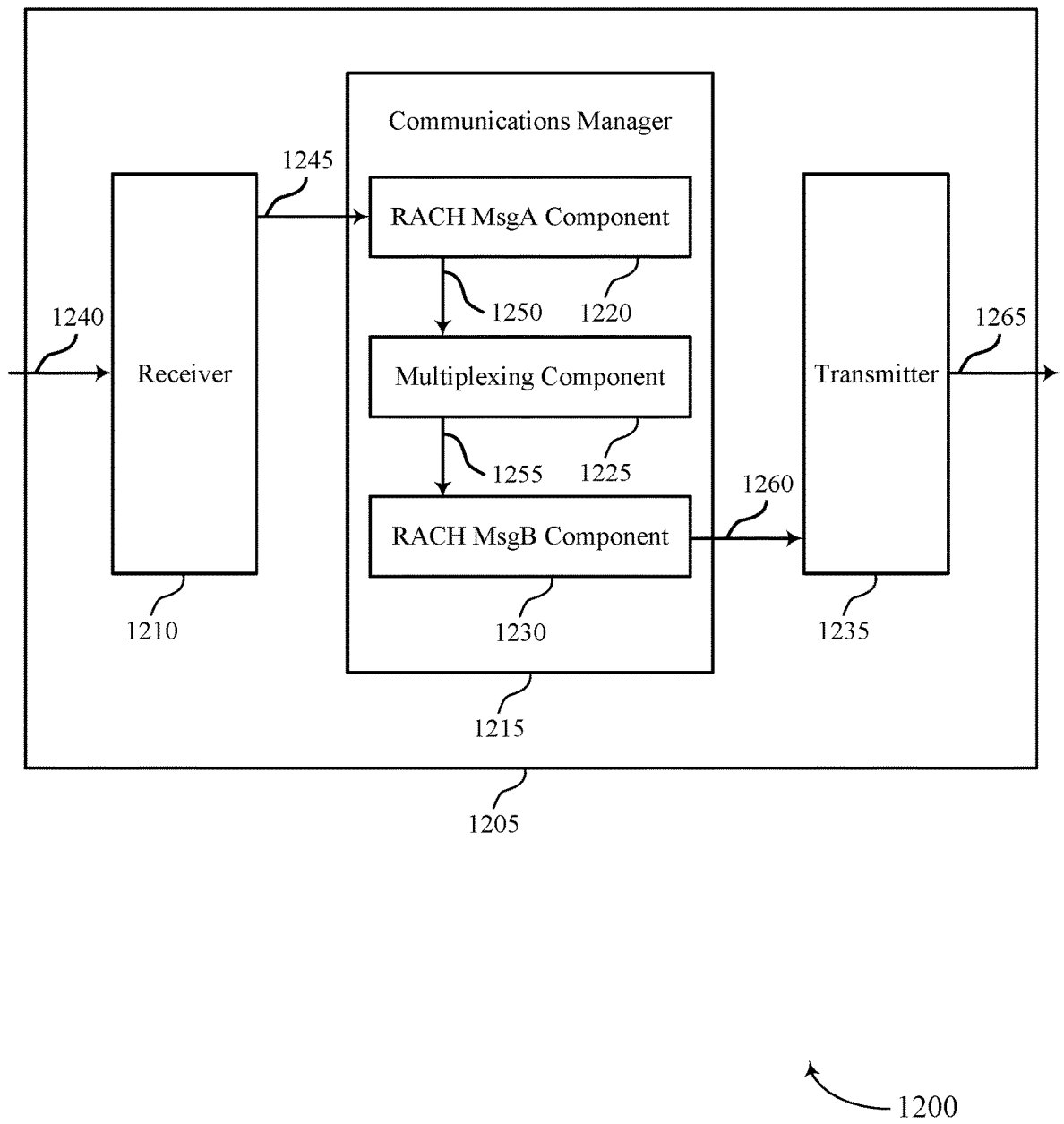

FIG. 12 shows a block diagram 1200 of a device 1205 that supports UE-assisted group response for a two-step random access procedure in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information 1240 such as packets, user data, or control information associated with various information channels (e.g., control channels, data channels, and information related to UE-assisted RACH MsgB group transmission, etc.). Information 1245 may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a RACH MsgA component 1220, a multiplexing component 1225, and a RACH MsgB component 1230. The communications manager 1215 may be an example of aspects of the communications manager 1410 described herein.

The RACH MsgA component 1220 may receive, from a set of UEs in a set of first messages for RACH procedures, a set of indications of respective modulation orders associated with reception of one or more second messages for the RACH procedures at the set of UEs. For example, the receiver 1210 may receive information 1240 over a channel (e.g., an uplink channel). In some examples, the receiver 1210 may send the information 1240 as information 1245 to the RACH MsgA component 1220, which may pass the information 1250 to the multiplexing component 1225 to support multiplexing operations. In some other examples, the RACH MsgA component 1220 may be implemented as a component of the receiver 1210.

The multiplexing component 1225 may multiplex a set of RACH responses for the set of UEs into one or more data portions for the one or more second messages based on the respective modulation orders. For example, the multiplexing component 1225 may receive information 1250 indicating the respective modulation orders received from the UEs. The multiplexing component 1225 may determine which RACH responses to multiplex together based on the indicated modulation orders. The multiplexing component 1225 may send the one or more second messages as information 1255 to the RACH MsgB component 1230, where the one or more second messages include the RACH responses multiplexed in the data portions.

The RACH MsgB component 1230 may transmit, to the set of UEs, the one or more second messages, where each second message of the one or more second messages includes a respective DCI portion indicating a modulation order and a respective data portion of the one or more data portions. For example, the RACH MsgB component 1230 may prepare payloads 1260 for transmission in the second messages for the RACH procedures. The RACH MsgB component 1230 may send the payloads 1260 for transmission by the transmitter 1235 in one or more signals 1265. In some cases, the RACH MsgB component 1230 may be a component of the transmitter 1235.

Additionally, or alternatively, the RACH MsgA component 1220 may receive, from a set of UEs in a set of first messages for RACH procedures, a set of indications of respective maximum numbers of repetitions associated with reception of one or more second messages for the RACH procedures at the set of UEs. For example, the RACH MsgA component 1220 may be a component of the receiver 1210 or may communicate with the receiver 1210 to receive the set of first messages as information 1240 signaled over a channel. The multiplexing component 1225 may multiplex a set of RACH responses for the set of UEs into one or more repeated data portions for the one or more second messages based on the respective maximum numbers of repetitions. The RACH MsgB component 1230 may transmit, to the set of UEs, the one or more second messages, where each second message of the one or more second messages includes a respective DCI portion indicating a maximum number of repetitions and a respective repeated data portion of the one or more repeated data portions. For example, the RACH MsgB component 1230 may be a component of the transmitter 1235 or may communicate with the transmitter 1235 to send the one or more second messages as signals 1265.

The transmitter 1235 may transmit signals 1265 generated by other components of the device 1205 (e.g., payloads 1260 generated for transmission). In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
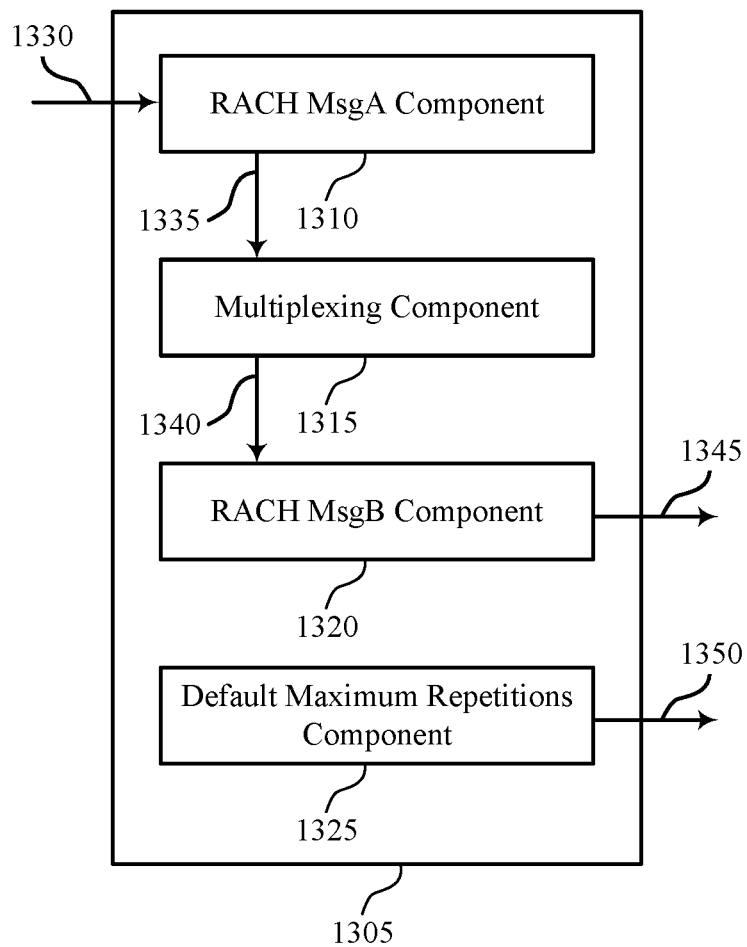
FIG. 13 shows a block diagram of a communications manager that supports UE-assisted group response for a two-step random access procedure in accordance with aspects of the present disclosure.

FIG. 13 shows a block diagram 1300 of a communications manager 1305 that supports UE-assisted group response for a two-step random access procedure in accordance with aspects of the present disclosure. The communications manager 1305 may be an example of aspects of a communications manager 1115, a communications manager 1215, or a communications manager 1410 described herein. The communications manager 1305 may include a RACH MsgA component 1310, a multiplexing component 1315, a RACH MsgB component 1320, and a default maximum repetitions component 1325. Each of these components may communicate, directly or indirectly, with one another (e.g., via one or more buses).

In some implementations, the RACH MsgA component 1310 may receive, from a set of UEs in a set of first messages for RACH procedures, a set of indications of respective modulation orders associated with reception of one or more second messages for the RACH procedures at the set of UEs. For example, the RACH MsgA component 1310 may be coupled with or a component of a receiver or transceiver. The RACH MsgA component 1310 may receive signals 1330 corresponding to the set of first messages for the RACH procedures. The RACH MsgA component 1310 may decode the signals (e.g., using a decoder) to determine the set of first messages, including the set of indications of respective modulation orders. The RACH MsgA component 1310 may send indications 1335 of the modulation orders to the multiplexing component 1315. In some cases, the respective modulation orders include QPSK, 16QAM, 64QAM, 256QAM, or a combination thereof.

The multiplexing component 1315 may multiplex a set of RARs for the set of UEs into one or more data portions for the one or more second messages based on the respective modulation orders. For example, the multiplexing component 1315 may receive indications 1335 of the modulation orders from the RACH MsgA component 1310 and may perform the multiplexing procedures based on such indications (e.g., using a multiplexer). The multiplexing component 1315 may send the resulting one or more data portions of the one or more second messages 1340 to the RACH MsgB component 1320.

The RACH MsgB component 1320 may transmit, to the set of UEs, the one or more second messages, where each second message of the one or more second messages includes a respective DCI portion indicating a modulation order and a respective data portion of the one or more data portions. For example, the RACH MsgB component 1320 may be coupled with or a component of a transmitter or transceiver. The RACH MsgB component 1320 may receive the one or more data portions of the one or more second messages 1340 from a multiplexer. The RACH MsgB component 1320 may modulate the one or more second messages for the RACH procedure over a set of time-frequency resources for transmission and may transmit the second messages as signals 1345.

In some examples, the multiplexing component 1315 may multiplex a first subset of RARs of the set of RARs into a first data portion for a first of the one or more second messages based on the first subset of RARs being in response to a first subset of the set of first messages including indications of a first modulation order of the respective modulation orders. In some such examples, the multiplexing component 1315 may multiplex a second subset of RARs of the set of RARs into a second data portion for a second of the one or more second messages based on the second subset of RARs being in response to a second subset of the set of first messages including indications of a second modulation order of the respective modulation orders different from the first modulation order.

In some other examples, the multiplexing component 1315 may multiplex the set of RARs into a data portion for a second message based on suppressing validation of a modulation order at the set of UEs for the data portion. In some such other examples, the RACH MsgB component 1320 may transmit, to the set of UEs, the second message including a DCI portion and the data portion, where the DCI portion indicates the suppression of the validation of the modulation order at the set of UEs for the data portion.

Additionally, or alternatively, in some implementations, the RACH MsgA component 1310 may receive, from a set of UEs in a set of first messages for RACH procedures, a set of indications of respective maximum numbers of repetitions associated with reception of one or more second messages for the RACH procedures at the set of UEs.

The multiplexing component 1315 may multiplex a set of RARs for the set of UEs into one or more repeated data portions for the one or more second messages based on the respective maximum numbers of repetitions. The RACH MsgB component 1320 may transmit, to the set of UEs, the one or more second messages, where each second message of the one or more second messages includes a respective DCI portion indicating a maximum number of repetitions and a respective repeated data portion of the one or more repeated data portions.

In some examples, the multiplexing component 1315 may multiplex a first subset of RARs of the set of RARs into a first repeated data portion for a first of the one or more second messages based on the first subset of RARs being in response to a first subset of the set of first messages including indications of a first maximum number of repetitions of the respective maximum numbers of repetitions. In some such examples, the multiplexing component 1315 may multiplex a second subset of RARs of the set of RARs into a second repeated data portion for a second of the one or more second messages based on the second subset of RARs being in response to a second subset of the set of first messages including indications of a second maximum number of repetitions of the respective maximum numbers of repetitions different from the first maximum number of repetitions.

In some other examples, the multiplexing component 1315 may multiplex the set of RARs into a repeated data portion for a second message based on suppressing validation of a maximum number of repetitions at the set of UEs for the repeated data portion. In some such other examples, the RACH MsgB component 1320 may transmit, to the set of UEs, the second message including a DCI portion and the repeated data portion, where the DCI portion indicates the suppression of the validation of the maximum number of repetitions at the set of UEs for the repeated data portion.

In some yet other examples, the multiplexing component 1315 may multiplex a subset of RARs of the set of RARs into a data portion for a first of the one or more second messages based on the data portion for the first of the one or more second messages including no repetitions.

The default maximum repetitions component 1325 may transmit, to the set of UEs, an indication of a default maximum number of repetitions associated with reception of the one or more second messages, where the set of indications of the respective maximum numbers of repetitions are received in the set of first messages based on the respective maximum numbers of repetitions being different from the default maximum number of repetitions. For example, the default maximum repetitions component 1325 may be coupled with or a component of a transmitter or transceiver. The default maximum repetitions component 1325 may determine a default maximum number of repetitions to transmit to one or more UEs (e.g., in a configuration message). The default maximum repetitions component 1325 may modulate the configuration message over a set of time-frequency resources for transmission and may transmit the configuration message as a signal 1350.

Figure 14:
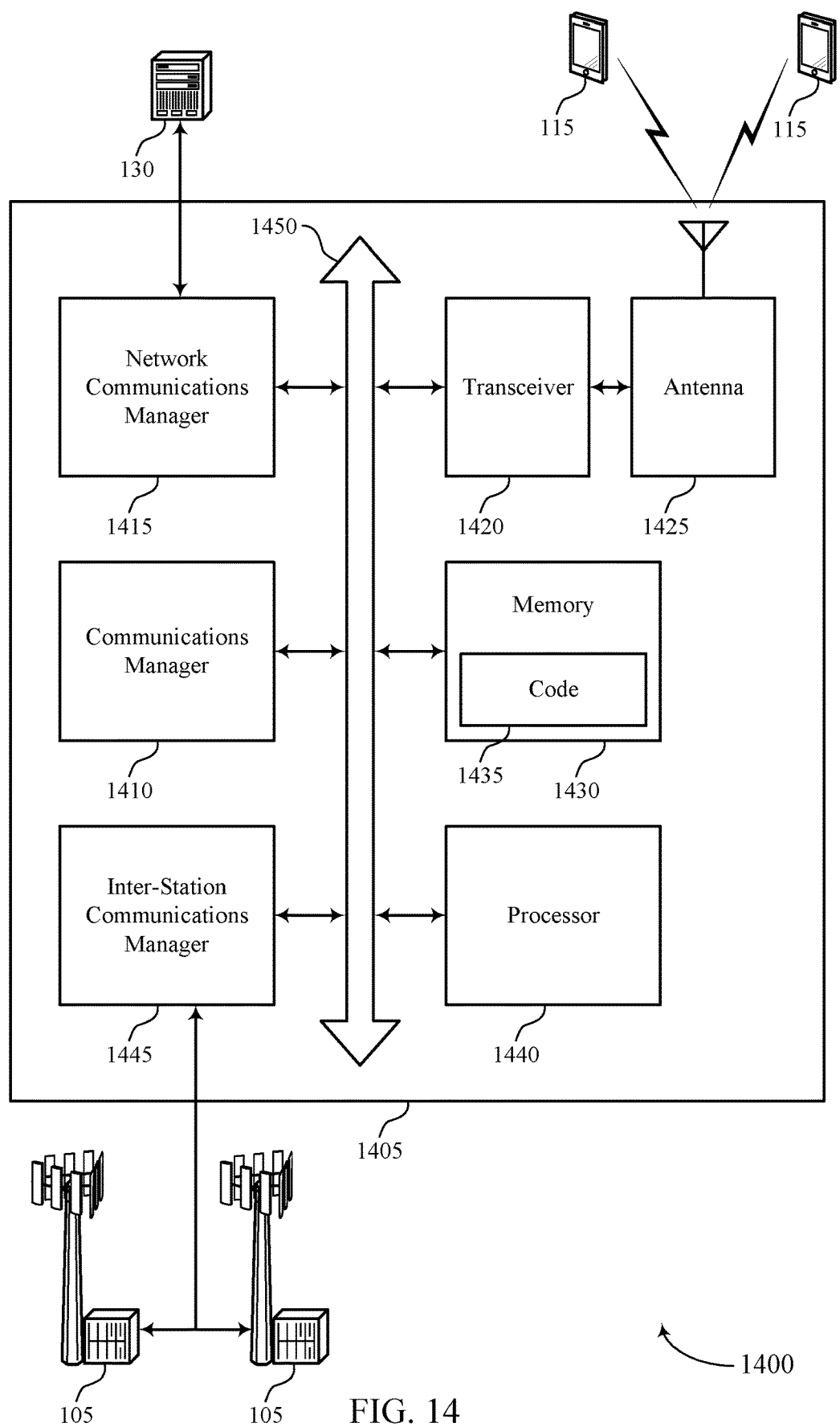
FIG. 14 shows a diagram of a system including a device that supports UE-assisted group response for a two-step random access procedure in accordance with aspects of the present disclosure.

FIG. 14 shows a diagram of a system 1400 including a device 1405 that supports UE-assisted group response for a two-step random access procedure in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

In some cases, the communications manager 1410 may receive, from a set of UEs in a set of first messages for RACH procedures, a set of indications of respective modulation orders associated with reception of one or more second messages for the RACH procedures at the set of UEs, multiplex a set of RARs for the set of UEs into one or more data portions for the one or more second messages based on the respective modulation orders, and transmit, to the set of UEs, the one or more second messages, where each second message of the one or more second messages includes a respective DCI portion indicating a modulation order and a respective data portion of the one or more data portions. Additionally, or alternatively, the communications manager 1410 may receive, from a set of UEs in a set of first messages for RACH procedures, a set of indications of respective maximum numbers of repetitions associated with reception of one or more second messages for the RACH procedures at the set of UEs, multiplex a set of RARs for the set of UEs into one or more repeated data portions for the one or more second messages based on the respective maximum numbers of repetitions, and transmit, to the set of UEs, the one or more second messages, where each second message of the one or more second messages includes a respective DCI portion indicating a maximum number of repetitions and a respective repeated data portion of the one or more repeated data portions.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting UE-assisted RACH MsgB group transmission).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
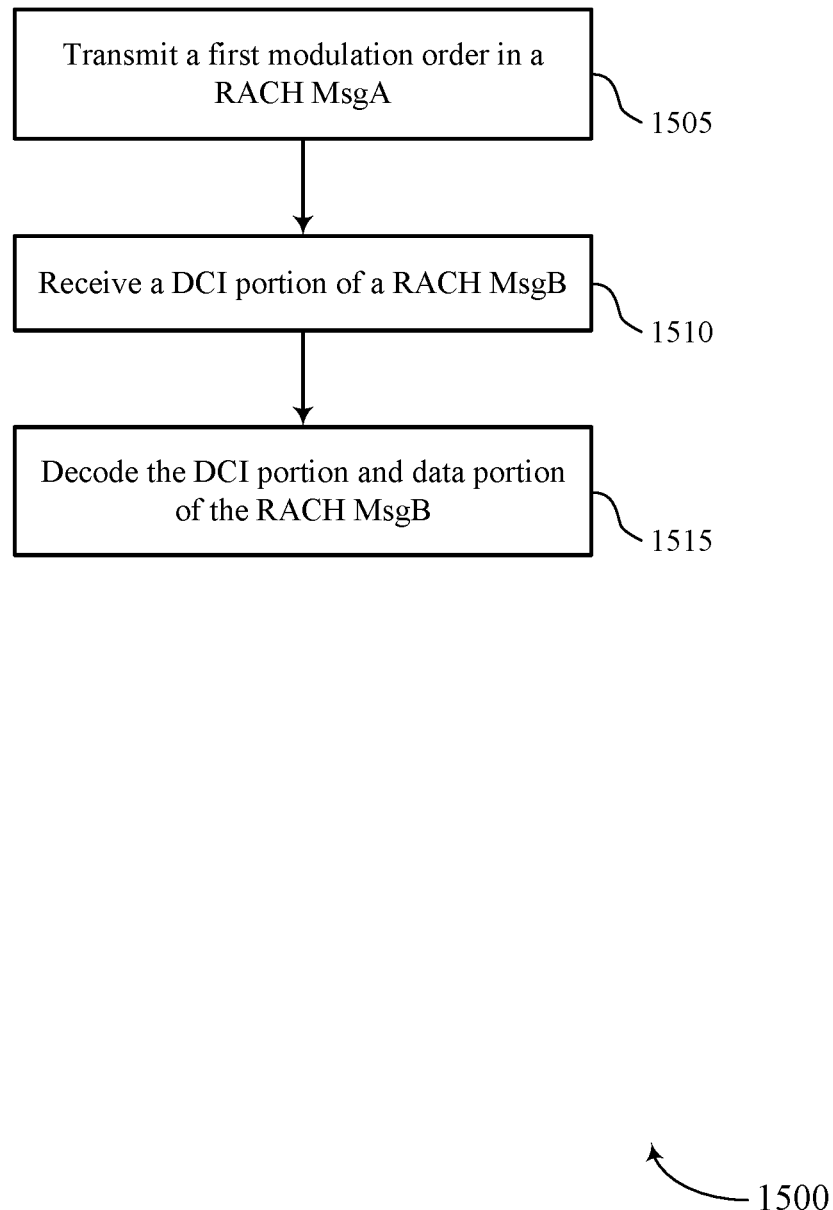
FIGS. 15 through 18 show flowcharts illustrating methods that support UE-assisted group response for a two-step random access procedure in accordance with aspects of the present disclosure.

FIG. 15 shows a flowchart illustrating a method 1500 that supports UE-assisted group response for a two-step random access procedure in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may transmit, to a base station in a first message for a RACH procedure, an indication of a first modulation order for receiving a second message for the RACH procedure from the base station. For example, the UE may identify time-frequency resources over which the first message for the RACH procedure is to be transmitted. The UE may modulate the first message for the RACH procedure over the identified time-frequency resources in order to transmit the message (e.g., on an uplink channel to a base station 105). The operations of 1505 may be performed according to the methods described herein. In some examples, aspects of the operations of 1505 may be performed by a RACH MsgA component as described with reference to FIGS. 7 through 10.

At 1510, the UE may receive, from the base station, a DCI portion of the second message. For example, the UE may receive the DCI portion of the second message on a PDCCH. The UE may identify time-frequency resources over which the DCI portion of the second message is transmitted and may demodulate the DCI portion over the identified time-frequency resources. The operations of 1510 may be performed according to the methods described herein. In some examples, aspects of the operations of 1510 may be performed by a RACH MsgB component as described with reference to FIGS. 7 through 10.

At 1515, the UE may decode the second message based on the DCI portion indicating the first modulation order, or indicating suppression of validation of a modulation order for a data portion of the second message, or both, including decoding the DCI portion of the second message and decoding the data portion of the second message. For example, the UE may perform a decoding procedure (e.g., a polar decoding procedure or other decoding procedure) by demodulating information received from a base station 105 (e.g., via a decoding candidate) and decoding the demodulated information. The UE may decode the DCI portion and the data portion to obtain bits indicating control information and data information respectively. The operations of 1515 may be performed according to the methods described herein. In some examples, aspects of the operations of 1515 may be performed by a decoder as described with reference to FIGS. 7 through 10.

Figure 16:
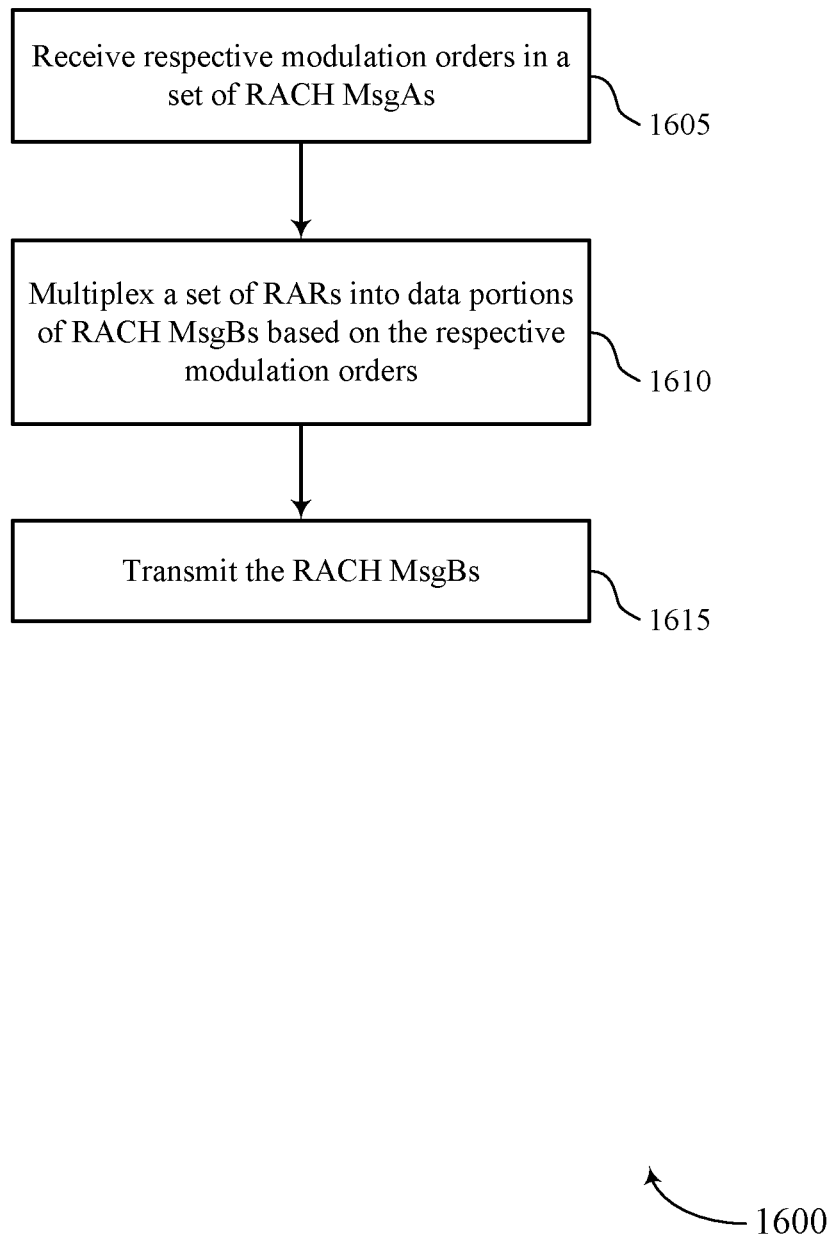

FIG. 16 shows a flowchart illustrating a method 1600 that supports UE-assisted group response for a two-step random access procedure in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may receive, from a set of UEs in a set of first messages for RACH procedures, a set of indications of respective modulation orders associated with reception of one or more second messages for the RACH procedures at the set of UEs. The base station may identify time-frequency resources over which the set of first messages for RACH procedures are transmitted and may demodulate the messages over the identified time-frequency resources. The operations of 1605 may be performed according to the methods described herein. In some examples, aspects of the operations of 1605 may be performed by a RACH MsgA component as described with reference to FIGS. 11 through 14.

At 1610, the base station may multiplex a set of RARs for the set of UEs into one or more data portions for the one or more second messages based on the respective modulation orders. For example, the base station may multiplex bits including information for one or more RARs into one or more waveforms corresponding to the one or more second messages. In some cases, the grouping may be based on common modulation orders for the RARs. The operations of 1610 may be performed according to the methods described herein. In some examples, aspects of the operations of 1610 may be performed by a multiplexing component as described with reference to FIGS. 11 through 14.

At 1615, the base station may transmit, to the set of UEs, the one or more second messages, where each second message of the one or more second messages includes a respective DCI portion indicating a modulation order and a respective data portion of the one or more data portions. For example, the base station may identify time-frequency resources over which the one or more second messages for the RACH procedures are to be transmitted. The base station may modulate the second messages over the identified time-frequency resources (e.g., based on the multiplexing) in order to transmit the second messages (e.g., on one or more downlink channels to the UEs 115). The operations of 1615 may be performed according to the methods described herein. In some examples, aspects of the operations of 1615 may be performed by a RACH MsgB component as described with reference to FIGS. 11 through 14.

Figure 17:
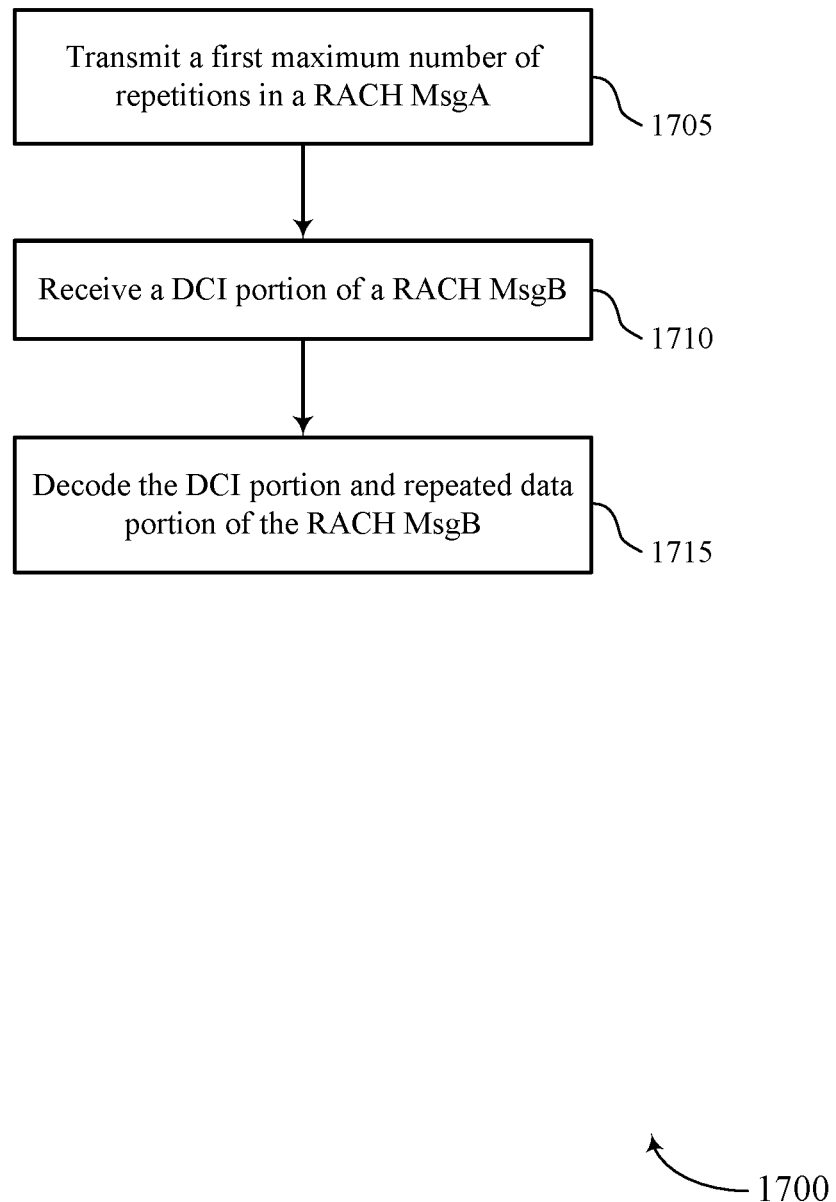

FIG. 17 shows a flowchart illustrating a method 1700 that supports UE-assisted group response for a two-step random access procedure in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may transmit, to a base station in a first message for a RACH procedure, an indication of a first maximum number of repetitions for receiving a second message for the RACH procedure. For example, the UE may identify time-frequency resources over which the first message for the RACH procedure is to be transmitted. The UE may modulate the first message for the RACH procedure over the identified time-frequency resources in order to transmit the message (e.g., on an uplink channel to a base station 105). The operations of 1705 may be performed according to the methods described herein. In some examples, aspects of the operations of 1705 may be performed by a RACH MsgA component as described with reference to FIGS. 7 through 10.

At 1710, the UE may receive, from the base station, a DCI portion of the second message. For example, the UE may receive the DCI portion of the second message on a PDCCH. The UE may identify time-frequency resources over which the DCI portion of the second message is transmitted and may demodulate the DCI portion over the identified time-frequency resources. The operations of 1710 may be performed according to the methods described herein. In some examples, aspects of the operations of 1710 may be performed by a RACH MsgB component as described with reference to FIGS. 7 through 10.

At 1715, the UE may decode the second message based on the DCI portion indicating the first maximum number of repetitions, or indicating suppression of validation of a maximum number of repetitions for a repeated data portion of the second message, or both, including decoding the DCI portion of the second message and decoding the repeated data portion of the second message. For example, the UE may perform a decoding procedure (e.g., a polar decoding procedure or other decoding procedure) by demodulating information received from a base station 105 (e.g., via a decoding candidate) and decoding the demodulated information. The UE may decode the DCI portion and the repeated data portion to obtain bits indicating control information and data information respectively. The operations of 1715 may be performed according to the methods described herein. In some examples, aspects of the operations of 1715 may be performed by a decoder as described with reference to FIGS. 7 through 10.

Figure 18:
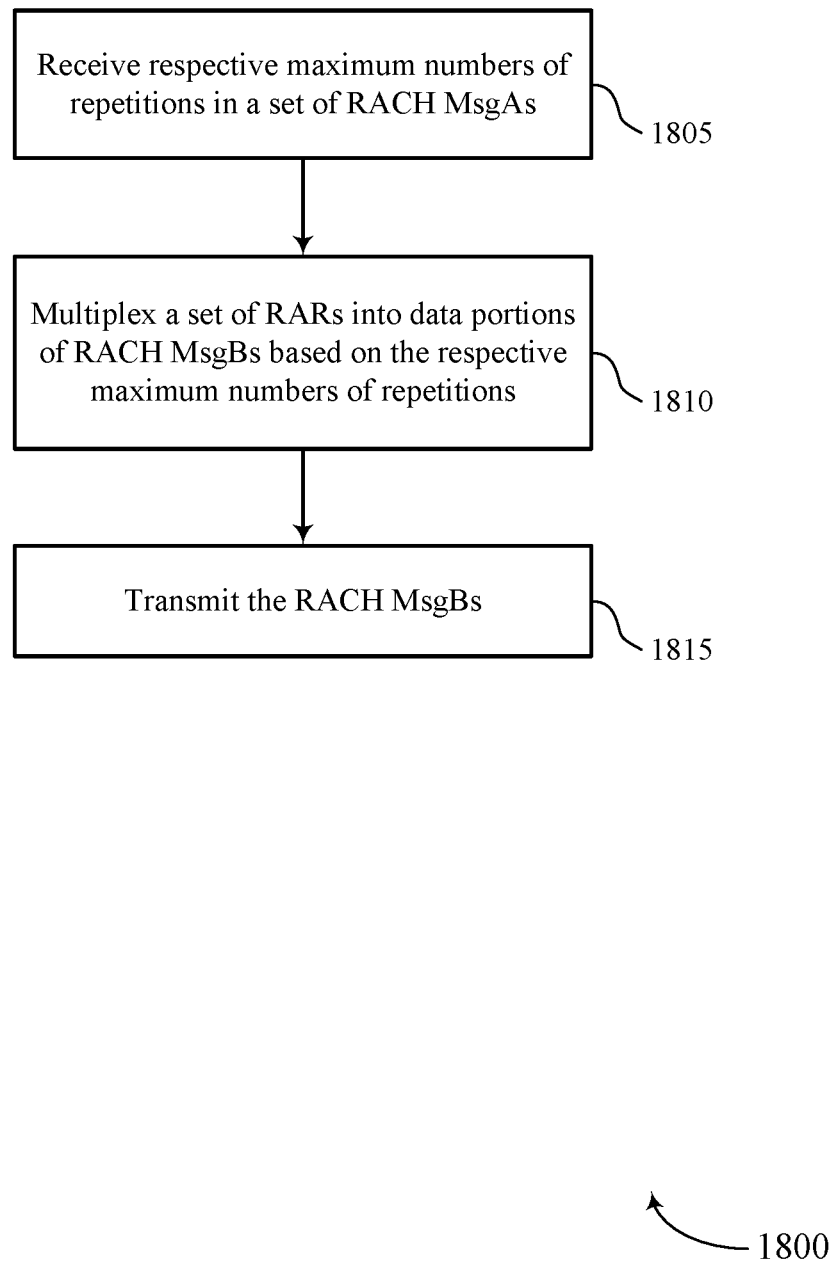

FIG. 18 shows a flowchart illustrating a method 1800 that supports UE-assisted group response for a two-step random access procedure in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1805, the base station may receive, from a set of UEs in a set of first messages for RACH procedures, a set of indications of respective maximum numbers of repetitions associated with reception of one or more second messages for the RACH procedures at the set of UEs. The base station may identify time-frequency resources over which the set of first messages for RACH procedures are transmitted and may demodulate the messages over the identified time-frequency resources. The operations of 1805 may be performed according to the methods described herein. In some examples, aspects of the operations of 1805 may be performed by a RACH MsgA component as described with reference to FIGS. 11 through 14.

At 1810, the base station may multiplex a set of RACH responses for the set of UEs into one or more repeated data portions for the one or more second messages based on the respective maximum numbers of repetitions. For example, the base station may multiplex bits including information for one or more RARs into one or more waveforms corresponding to the one or more second messages. In some cases, the grouping may be based on common maximum numbers of repetitions for the RARs. The operations of 1810 may be performed according to the methods described herein. In some examples, aspects of the operations of 1810 may be performed by a multiplexing component as described with reference to FIGS. 11 through 14.

At 1815, the base station may transmit, to the set of UEs, the one or more second messages, where each second message of the one or more second messages includes a respective DCI portion indicating a maximum number of repetitions and a respective repeated data portion of the one or more repeated data portions. For example, the base station may identify time-frequency resources over which the one or more second messages for the RACH procedures are to be transmitted. The base station may modulate the second messages over the identified time-frequency resources (e.g., based on the multiplexing) in order to transmit the second messages (e.g., on one or more downlink channels to the UEs 115). The operations of 1815 may be performed according to the methods described herein. In some examples, aspects of the operations of 1815 may be performed by a RACH MsgB component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting, to a base station in a first message for a random access procedure, an indication of a first modulation order for receiving a second message for the random access procedure from the base station; receiving, from the base station, a DCI portion of the second message; and decoding the second message based at least in part on the DCI portion indicating the first modulation order, or indicating suppression of validation of a modulation order for a data portion of the second message, or both, including decoding the DCI portion of the second message and decoding the data portion of the second message.

Aspect 2: The method of aspect 1, further comprising: receiving, from the base station, an additional DCI portion of an additional second message for the random access procedure; and decoding the additional second message based at least in part on the additional DCI portion indicating a second modulation order different from the first modulation order, including decoding the additional DCI portion of the additional second message and not decoding an additional data portion of the additional second message.

Aspect 3: The method of aspect 2, wherein the additional data portion is not decoded further based at least in part on the decoded additional DCI portion indicating no suppression of the validation of the modulation order for the additional data portion.

Aspect 4: The method of any of aspects 1 through 3, wherein the decoded DCI portion comprises a bit field indicating an MCS; and the data portion is decoded based at least in part on the MCS corresponding to the first modulation order.

Aspect 5: The method of any of aspects 1 through 3, wherein the decoded DCI portion comprises a one bit indicator indicating that the validation of the modulation order for the data portion is suppressed; and the data portion is decoded based at least in part on the one bit indicator.

Aspect 6: The method of any of aspects 1 through 5, wherein the indication of the first modulation order in the first message comprises a bit field in a PHY layer signaling message, a MAC CE, or both.

Aspect 7: The method of any of aspects 1 through 6, wherein the first modulation order comprises QPSK, 16QAM, 64QAM, or 256QAM.

Aspect 8: A method for wireless communications at a base station, comprising: receiving, from a plurality of UEs in a plurality of first messages for random access procedures, a plurality of indications of respective modulation orders associated with reception of one or more second messages for the random access procedures at the plurality of UEs; multiplexing a plurality of RARs for the plurality of UEs into one or more data portions for the one or more second messages based at least in part on the respective modulation orders; and transmitting, to the plurality of UEs, the one or more second messages, wherein each second message of the one or more second messages comprises a respective DCI portion indicating a modulation order and a respective data portion of the one or more data portions.

Aspect 9: The method of aspect 8, wherein the multiplexing comprises: multiplexing a first subset of RARs of the plurality of RARs into a first data portion for a first of the one or more second messages based at least in part on the first subset of RARs being in response to a first subset of the plurality of first messages comprising indications of a first modulation order of the respective modulation orders; and multiplexing a second subset of RARs of the plurality of RARs into a second data portion for a second of the one or more second messages based at least in part on the second subset of RARs being in response to a second subset of the plurality of first messages comprising indications of a second modulation order of the respective modulation orders different from the first modulation order.

Aspect 10: The method of aspect 8, wherein the multiplexing comprises: multiplexing the plurality of RARs into a data portion for a second message based at least in part on suppressing validation of a modulation order at the plurality of UEs for the data portion; and the transmitting comprises: transmitting, to the plurality of UEs, the second message comprising a DCI portion and the data portion, wherein the DCI portion indicates the suppression of the validation of the modulation order at the plurality of UEs for the data portion.

Aspect 11: The method of any of aspects 8 through 10, wherein the respective modulation orders comprise QPSK, 16QAM, 64QAM, 256QAM, or a combination thereof.

Aspect 12: A method for wireless communications at a UE, comprising: transmitting, to a base station in a first message for a random access procedure, an indication of a first maximum number of repetitions for receiving a second message for the random access procedure; receiving, from the base station, a DCI portion of the second message; and decoding the second message based at least in part on the DCI portion indicating the first maximum number of repetitions, or indicating suppression of validation of a maximum number of repetitions for a repeated data portion of the second message, or both, including decoding the DCI portion of the second message and decoding the repeated data portion of the second message.

Aspect 13: The method of aspect 12, further comprising: receiving, from the base station, an additional DCI portion of an additional second message for the random access procedure; and decoding the additional second message based at least in part on the additional DCI portion indicating a second maximum number of repetitions different from the first maximum number of repetitions, including decoding the additional DCI portion of the additional second message and not decoding an additional repeated data portion of the additional second message.

Aspect 14: The method of aspect 13, wherein the additional repeated data portion is not decoded further based at least in part on the decoded additional DCI portion indicating no suppression of the validation of the maximum number of repetitions for the additional repeated data portion.

Aspect 15: The method of aspect 12, further comprising: receiving, from the base station, an additional DCI portion of an additional second message for the random access procedure; and decoding the additional second message based at least in part on the additional DCI portion indicating no repetitions for an additional data portion, including decoding the additional DCI portion of the additional second message and not decoding the additional data portion of the additional second message.

Aspect 16: The method of any of aspects 12 through 15, further comprising: receiving, from the base station, an indication of a default maximum number of repetitions for receiving the second message, wherein the indication of the first maximum number of repetitions is transmitted in the first message based at least in part on the first maximum number of repetitions being different from the default maximum number of repetitions.

Aspect 17: The method of any of aspects 12 through 16, wherein the decoded DCI portion comprises a one bit indicator indicating that the maximum number of repetitions for the repeated data portion corresponds to the first maximum number of repetitions indicated in the first message; and the repeated data portion is decoded based at least in part on the one bit indicator.

Aspect 18: The method of any of aspects 12 through 16, wherein the decoded DCI portion comprises a bit field indicating the maximum number of repetitions for the repeated data portion; and the repeated data portion is decoded based at least in part on the maximum number of repetitions for the repeated data portion indicated by the bit field being equal to the first maximum number of repetitions indicated in the first message.

Aspect 19: The method of any of aspects 12 through 16, wherein the decoded DCI portion comprises a bit field indicating that the validation of the maximum number of repetitions for the repeated data portion is suppressed; and the repeated data portion is decoded based at least in part on the bit field.

Aspect 20: The method of any of aspects 12 through 19, wherein the indication of the first maximum number of repetitions in the first message comprises a bit field in a PHY layer signaling message, a MAC CE, or both.

Aspect 21: A method for wireless communications at a base station, comprising: receiving, from a plurality of UEs in a plurality of first messages for random access procedures, a plurality of indications of respective maximum numbers of repetitions associated with reception of one or more second messages for the random access procedures at the plurality of UEs; multiplexing a plurality of RARs for the plurality of UEs into one or more repeated data portions for the one or more second messages based at least in part on the respective maximum numbers of repetitions; and transmitting, to the plurality of UEs, the one or more second messages, wherein each second message of the one or more second messages comprises a respective DCI portion indicating a maximum number of repetitions and a respective repeated data portion of the one or more repeated data portions.

Aspect 22: The method of aspect 21, wherein the multiplexing comprises: multiplexing a first subset of RARs of the plurality of RARs into a first repeated data portion for a first of the one or more second messages based at least in part on the first subset of RARs being in response to a first subset of the plurality of first messages comprising indications of a first maximum number of repetitions of the respective maximum numbers of repetitions; and multiplexing a second subset of RARs of the plurality of RARs into a second repeated data portion for a second of the one or more second messages based at least in part on the second subset of RARs being in response to a second subset of the plurality of first messages comprising indications of a second maximum number of repetitions of the respective maximum numbers of repetitions different from the first maximum number of repetitions.

Aspect 23: The method of aspect 21, wherein the multiplexing comprises: multiplexing the plurality of RARs into a repeated data portion for a second message based at least in part on suppressing validation of a maximum number of repetitions at the plurality of UEs for the repeated data portion; and the transmitting comprises: transmitting, to the plurality of UEs, the second message comprising a DCI portion and the repeated data portion, wherein the DCI portion indicates the suppression of the validation of the maximum number of repetitions at the plurality of UEs for the repeated data portion.

Aspect 24: The method of aspect 21, wherein the multiplexing comprises: multiplexing a subset of RARs of the plurality of RARs into a data portion for a first of the one or more second messages based at least in part on the data portion for the first of the one or more second messages comprising no repetitions.

Aspect 25: The method of any of aspects 21 through 24, further comprising: transmitting, to the plurality of UEs, an indication of a default maximum number of repetitions associated with reception of the one or more second messages, wherein the plurality of indications of the respective maximum numbers of repetitions are received in the plurality of first messages based at least in part on the respective maximum numbers of repetitions being different from the default maximum number of repetitions.

Aspect 26: An apparatus for wireless communications at a UE, comprising a processor; memory coupled with the processor; and instructions stored in the memory and executable by the processor to cause the apparatus to perform a method of any of aspects 1 through 7.

Aspect 27: An apparatus for wireless communications at a UE, comprising at least one means for performing a method of any of aspects 1 through 7.

Aspect 28: A non-transitory computer-readable medium storing code for wireless communications at a UE, the code comprising instructions executable by a processor to perform a method of any of aspects 1 through 7.

Aspect 29: An apparatus for wireless communications at a base station, comprising a processor; memory coupled with the processor; and instructions stored in the memory and executable by the processor to cause the apparatus to perform a method of any of aspects 8 through 11.

Aspect 30: An apparatus for wireless communications at a base station, comprising at least one means for performing a method of any of aspects 8 through 11.

Aspect 31: A non-transitory computer-readable medium storing code for wireless communications at a base station, the code comprising instructions executable by a processor to perform a method of any of aspects 8 through 11.

Aspect 32: An apparatus for wireless communications at a UE, comprising a processor; memory coupled with the processor; and instructions stored in the memory and executable by the processor to cause the apparatus to perform a method of any of aspects 12 through 20.

Aspect 33: An apparatus for wireless communications at a UE, comprising at least one means for performing a method of any of aspects 12 through 20.

Aspect 34: A non-transitory computer-readable medium storing code for wireless communications at a UE, the code comprising instructions executable by a processor to perform a method of any of aspects 12 through 20.

Aspect 35: An apparatus for wireless communications at a base station, comprising a processor; memory coupled with the processor; and instructions stored in the memory and executable by the processor to cause the apparatus to perform a method of any of aspects 21 through 25.

Aspect 36: An apparatus for wireless communications at a base station, comprising at least one means for performing a method of any of aspects 21 through 25.

Aspect 37: A non-transitory computer-readable medium storing code for wireless communications at a base station, the code comprising instructions executable by a processor to perform a method of any of aspects 21 through 25.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
    a processor;
    memory coupled with the processor; and
    instructions stored in the memory and executable by the processor to cause the apparatus to:
        transmit, in a first message for a random access procedure, an indication of a first modulation order for receiving a second message for the random access procedure;
        receive a downlink control information portion of the second message; and
        decode the second message based at least in part on the downlink control information portion indicating the first modulation order, or indicating suppression of validation of a modulation order for a data portion of the second message, or both, including decoding the downlink control information portion of the second message and decoding the data portion of the second message.

2. The apparatus of claim 1, wherein the instructions are further executable by the processor to cause the apparatus to:
    receive an additional downlink control information portion of an additional second message for the random access procedure; and
    decode the additional second message based at least in part on the additional downlink control information portion indicating a second modulation order different from the first modulation order, including decoding the additional downlink control information portion of the additional second message and not decoding an additional data portion of the additional second message.

3. The apparatus of claim 2, wherein the additional data portion is not decoded further based at least in part on the decoded additional downlink control information portion indicating no suppression of the validation of the modulation order for the additional data portion.

4. The apparatus of claim 1, wherein:
the decoded downlink control information portion comprises a bit field indicating a modulation and coding scheme; and
the data portion is decoded based at least in part on the modulation and coding scheme corresponding to the first modulation order.

5. The apparatus of claim 1, wherein:
the decoded downlink control information portion comprises a one bit indicator indicating that the validation of the modulation order for the data portion is suppressed; and
the data portion is decoded based at least in part on the one bit indicator.

6. The apparatus of claim 1, wherein the indication of the first modulation order in the first message comprises a bit field in a physical layer signaling message, a medium access control control element, or both.

7. The apparatus of claim 1, wherein the first modulation order comprises quadrature phase shift keying, 16 quadrature amplitude modulation, 64 quadrature amplitude modulation, or 256 quadrature amplitude modulation.

8. An apparatus for wireless communications at a user equipment (UE), comprising:
a processor;
memory coupled with the processor; and
instructions stored in the memory and executable by the processor to cause the apparatus to:
transmit, in a first message for a random access procedure, an indication of a first maximum quantity of repetitions for receiving a second message for the random access procedure;
receive a downlink control information portion of the second message; and
decode the second message based at least in part on the downlink control information portion indicating the first maximum quantity of repetitions, or indicating suppression of validation of a maximum quantity of repetitions for a repeated data portion of the second message, or both, including decoding the downlink control information portion of the second message and decoding the repeated data portion of the second message.

9. The apparatus of claim 8, wherein the instructions are further executable by the processor to cause the apparatus to:
receive an additional downlink control information portion of an additional second message for the random access procedure; and
decode the additional second message based at least in part on the additional downlink control information portion indicating a second maximum quantityof repetitions different from the first maximum quantity of repetitions, including decoding the additional downlink control information portion of the additional second message and not decoding an additional repeated data portion of the additional second message.

10. The apparatus of claim 9, wherein the additional repeated data portion is not decoded further based at least in part on the decoded additional downlink control information portion indicating no suppression of the validation of the maximum quantity of repetitions for the additional repeated data portion.

11. The apparatus of claim 8, wherein the instructions are further executable by the processor to cause the apparatus to:
receive an additional downlink control information portion of an additional second message for the random access procedure; and
decode the additional second message based at least in part on the additional downlink control information portion indicating no repetitions for an additional data portion, including decoding the additional downlink control information portion of the additional second message and not decoding the additional data portion of the additional second message.

12. The apparatus of claim 8, wherein the instructions are further executable by the processor to cause the apparatus to:
receive an additional indication of a default maximum quantity of repetitions for receiving the second message, wherein the indication of the first maximum quantity of repetitions is transmitted in the first message based at least in part on the first maximum quantity of repetitions being different from the default maximum quantity of repetitions.

13. The apparatus of claim 8, wherein:
the decoded downlink control information portion comprises a one bit indicator indicating that the maximum quantity of repetitions for the repeated data portion corresponds to the first maximum quantity of repetitions indicated in the first message; and
the repeated data portion is decoded based at least in part on the one bit indicator.

14. The apparatus of claim 8, wherein:
the decoded downlink control information portion comprises a bit field indicating the maximum quantity of repetitions for the repeated data portion; and
the repeated data portion is decoded based at least in part on the maximum quantity of repetitions for the repeated data portion indicated using the bit field being equal to the first maximum quantity of repetitions indicated in the first message.

15. The apparatus of claim 8, wherein:
the decoded downlink control information portion comprises a bit field indicating that the validation of the maximum quantity of repetitions for the repeated data portion is suppressed; and
the repeated data portion is decoded based at least in part on the bit field.

16. The apparatus of claim 8, wherein the indication of the first maximum quantity of repetitions in the first message comprises a bit field in a physical layer signaling message, a medium access control control element, or both.

17. A method for wireless communications at a user equipment (UE), comprising:
transmitting, in a first message for a random access procedure, an indication of a first modulation order for receiving a second message for the random access procedure;
receiving a downlink control information portion of the second message; and
decoding the second message based at least in part on the downlink control information portion indicating the first modulation order, or indicating suppression of validation of a modulation order for a data portion of the second message, or both, including decoding the downlink control information portion of the second message and decoding the data portion of the second message.

18. The method of claim 17, further comprising:
receiving an additional downlink control information portion of an additional second message for the random access procedure; and decoding the additional second message based at least in part on the additional downlink control information portion indicating a second modulation order different from the first modulation order, including decoding the additional downlink control information portion of the additional second message and not decoding an additional data portion of the additional second message.

19. The method of claim 18, wherein the additional data portion is not decoded further based at least in part on the decoded additional downlink control information portion indicating no suppression of the validation of the modulation order for the additional data portion.

20. The method of claim 17, wherein:
the decoded downlink control information portion comprises a bit field indicating a modulation and coding scheme; and
the data portion is decoded based at least in part on the modulation and coding scheme corresponding to the first modulation order.

21. The method of claim 17, wherein:
the decoded downlink control information portion comprises a one bit indicator indicating that the validation of the modulation order for the data portion is suppressed; and
the data portion is decoded based at least in part on the one bit indicator.

22. The method of claim 17, wherein the indication of the first modulation order in the first message comprises a bit field in a physical layer signaling message, a medium access control control element, or both.

23. A method for wireless communications at a user equipment (UE), comprising:
transmitting, in a first message for a random access procedure, an indication of a first maximum quantity of repetitions for receiving a second message for the random access procedure;
receiving a downlink control information portion of the second message; and
decoding the second message based at least in part on the downlink control information portion indicating the first maximum quantity of repetitions, or indicating suppression of validation of a maximum quantity of repetitions for a repeated data portion of the second message, or both, including decoding the downlink control information portion of the second message and decoding the repeated data portion of the second message.

24. The method of claim 23, further comprising:
receiving an additional downlink control information portion of an additional second message for the random access procedure; and
decoding the additional second message based at least in part on the additional downlink control information portion indicating a second maximum quantity of repetitions different from the first maximum quantity of repetitions, including decoding the additional downlink control information portion of the additional second message and not decoding an additional repeated data portion of the additional second message.

25. The method of claim 24, wherein the additional repeated data portion is not decoded further based at least in part on the decoded additional downlink control information portion indicating no suppression of the validation of the maximum quantity of repetitions for the additional repeated data portion.

26. The method of claim 23, further comprising:
receiving an additional downlink control information portion of an additional second message for the random access procedure; and
decoding the additional second message based at least in part on the additional downlink control information portion indicating no repetitions for an additional data portion, including decoding the additional downlink control information portion of the additional second message and not decoding the additional data portion of the additional second message.

27. The method of claim 23, further comprising:
receiving an additional indication of a default maximum quantity of repetitions for receiving the second message, wherein the indication of the first maximum quantity of repetitions is transmitted in the first message based at least in part on the first maximum quantity of repetitions being different from the default maximum quantity of repetitions.

28. The method of claim 23, wherein:
the decoded downlink control information portion comprises a one bit indicator indicating that the maximum quantity of repetitions for the repeated data portion corresponds to the first maximum quantity of repetitions indicated in the first message; and
the repeated data portion is decoded based at least in part on the one bit indicator.

29. The method of claim 23, wherein:
the decoded downlink control information portion comprises a bit field indicating the maximum quantity of repetitions for the repeated data portion; and
the repeated data portion is decoded based at least in part on the maximum quantity of repetitions for the repeated data portion indicated using the bit field being equal to the first maximum quantity of repetitions indicated in the first message.

30. The method of claim 23, wherein:
the decoded downlink control information portion comprises a bit field indicating that the validation of the maximum quantity of repetitions for the repeated data portion is suppressed; and
the repeated data portion is decoded based at least in part on the bit field.

* * * * *